United States Patent
Aso et al.

(10) Patent No.: US 7,382,633 B2
(45) Date of Patent: Jun. 3, 2008

(54) DC CONVERTER

(75) Inventors: Shinji Aso, Niiza (JP); Ryuichi Furukoshi, Niiza (JP); Osamu Ohtake, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 283 days.

(21) Appl. No.: 11/369,871

(22) Filed: Mar. 8, 2006

(65) Prior Publication Data

US 2006/0215424 A1 Sep. 28, 2006

(30) Foreign Application Priority Data

Mar. 15, 2005 (JP) ............................ P2005-073668

(51) Int. Cl.
*H02M 3/335* (2006.01)
(52) U.S. Cl. ....................................... 363/21.04; 363/97
(58) Field of Classification Search .................. 363/16, 363/20, 21.01, 21.04, 21.05, 95, 97
See application file for complete search history.

(56) References Cited

U.S. PATENT DOCUMENTS 5,027,264 A * 6/1991 DeDoncker et al. .......... 363/16
5,991,172 A * 11/1999 Jovanovic et al. ....... 363/21.14
7,193,867 B2 * 3/2007 Aso ............................. 363/24

FOREIGN PATENT DOCUMENTS

JP 2000-92829 3/2000
WO WO 2005048439 A1 * 5/2005

OTHER PUBLICATIONS

U.S. Appl. No. 11/302,184, filed Dec. 14, 2005, Tsuruya et al.
U.S. Appl. No. 11/320,640, filed Dec. 30, 2005, Aso et al.
U.S. Appl. No. 11/355,166, filed Feb. 16, 2006, Aso et al.
U.S. Appl. No. 11/357,161, filed Feb. 21, 2006, Aso et al.
U.S. Appl. No. 11/369,871, filed Mar. 8, 2006, Aso et al.

* cited by examiner

*Primary Examiner*—Adolf Berhane
(74) *Attorney, Agent, or Firm*—Oblon, Spivak, McClelland, Maier & Neustadt, P.C.

(57) ABSTRACT

A DC converter includes a time difference detector to detect a time difference between a point around which a main switch provides a minimum voltage after an auxiliary switch turns off and a point at which the main switch turns on, an integrator to integrate the output of the time difference detector, and a first delay circuit to control a turn-on point of the main switch according to the output of the integrator and the output of the time difference detector. The first delay circuit operates to minimize the output of the time difference detector according to the output of the integrator and controls a turn-on point of the main switch in a pulse-by-pulse manner according to a pulse-by-pulse control signal based on the output of the time difference detector.

30 Claims, 27 Drawing Sheets

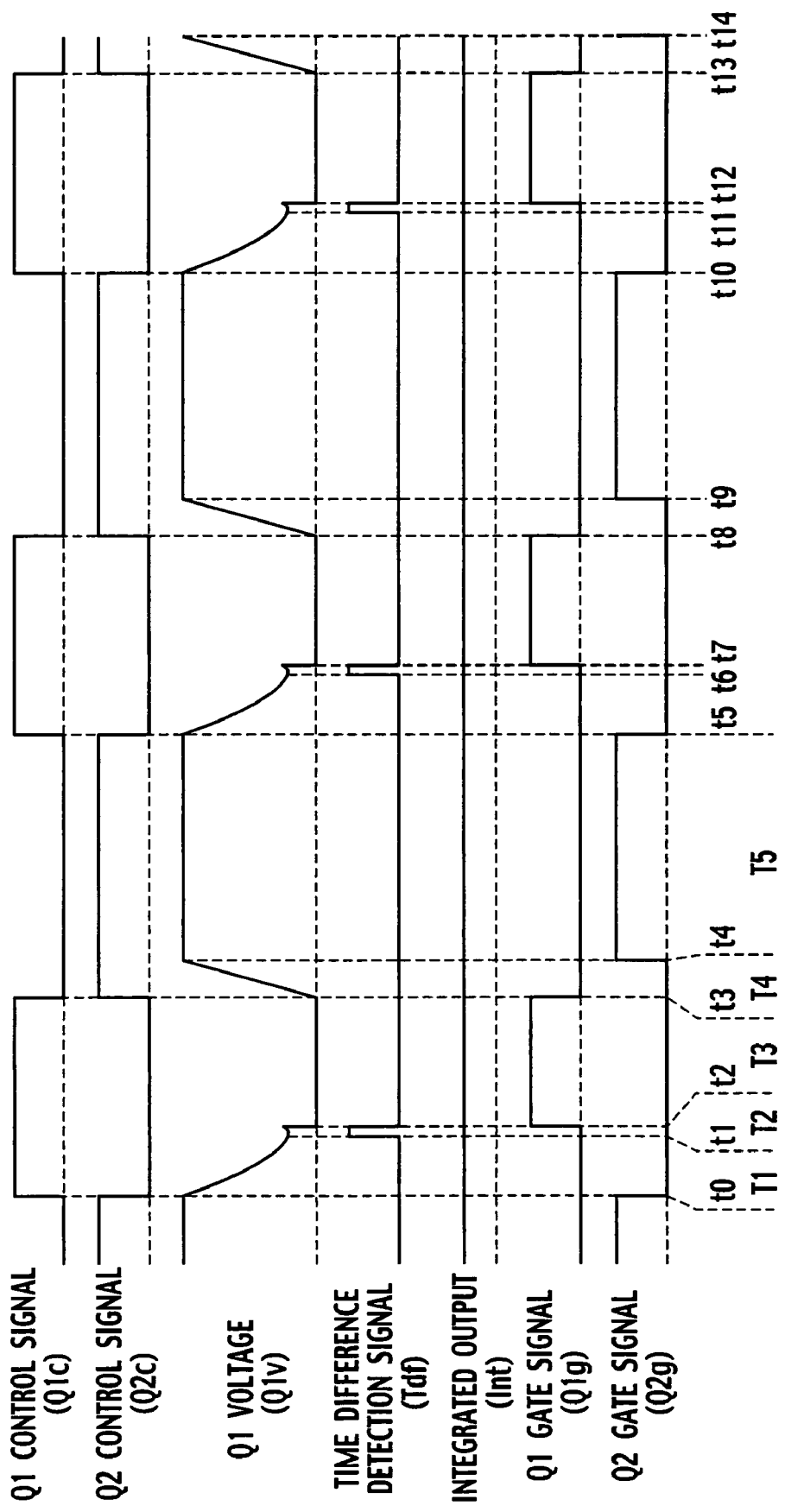

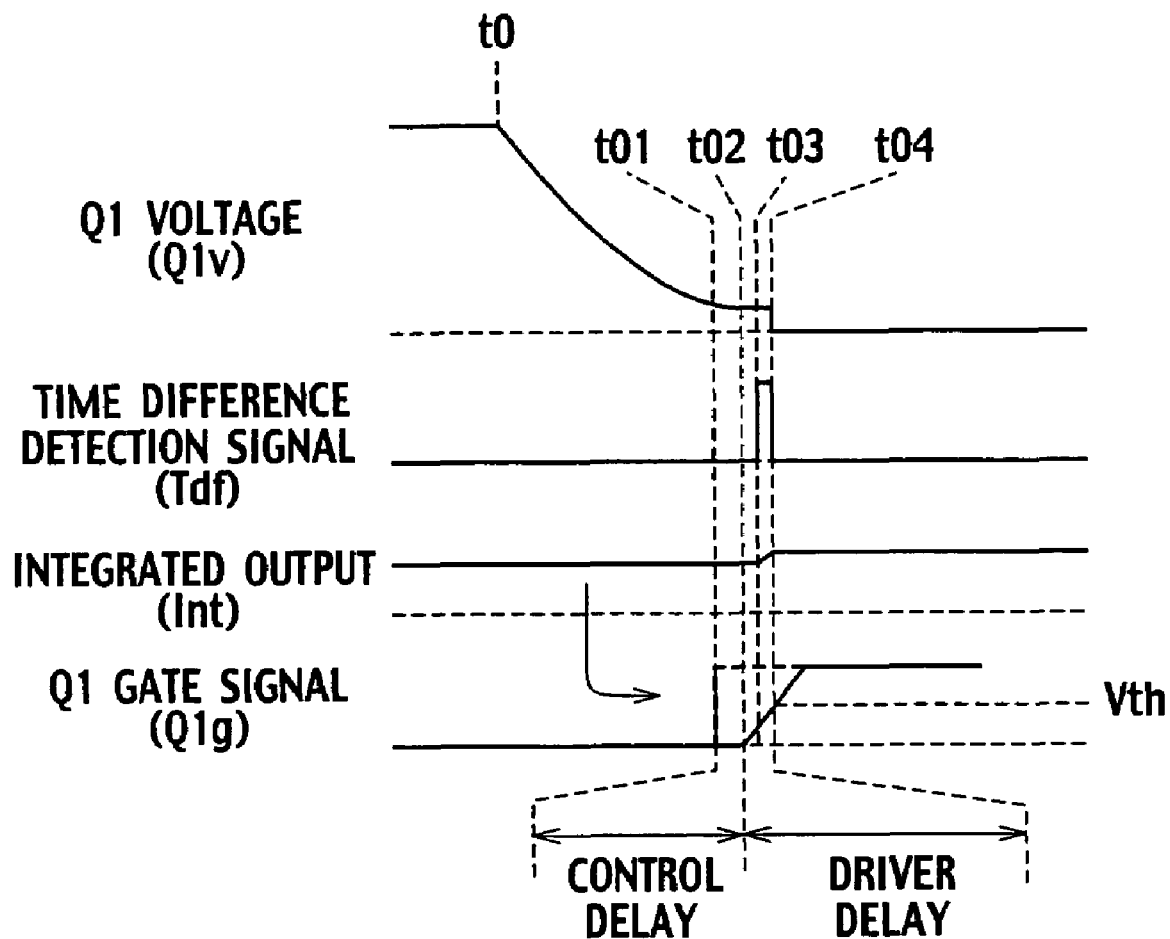

FIG. 14
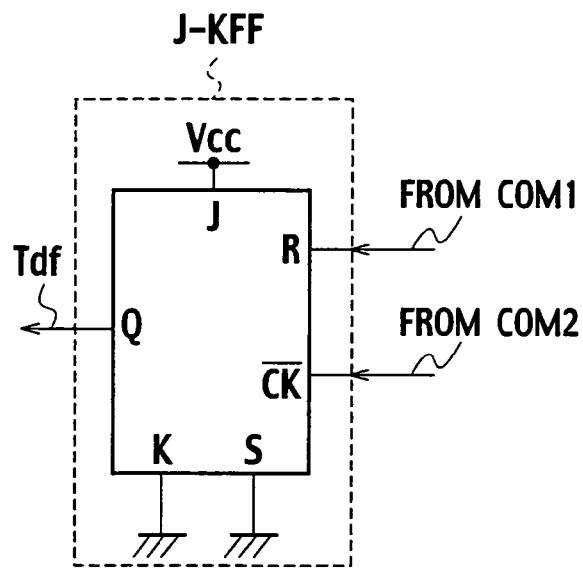
FIG. 15
| R | $\overline{CK}$ | Qn+1 |
|---|---|---|
| L | ↓ | H |
| H | ↓ | L |
| * | ↑ | Qn |
FIG. 16
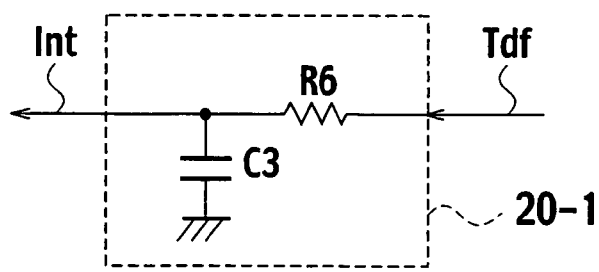

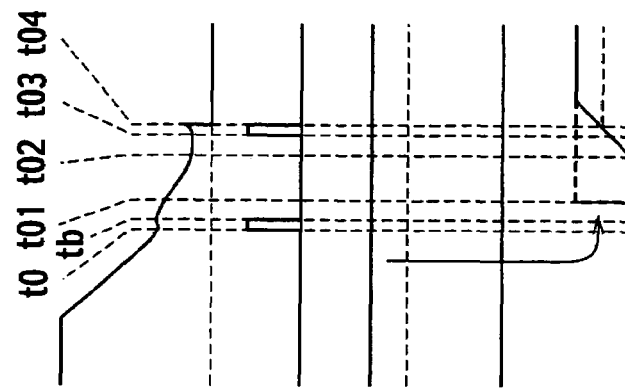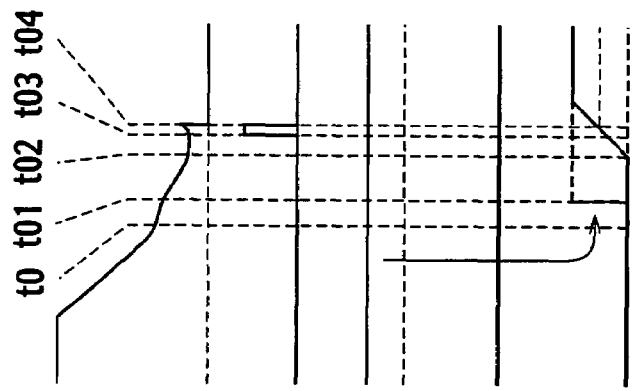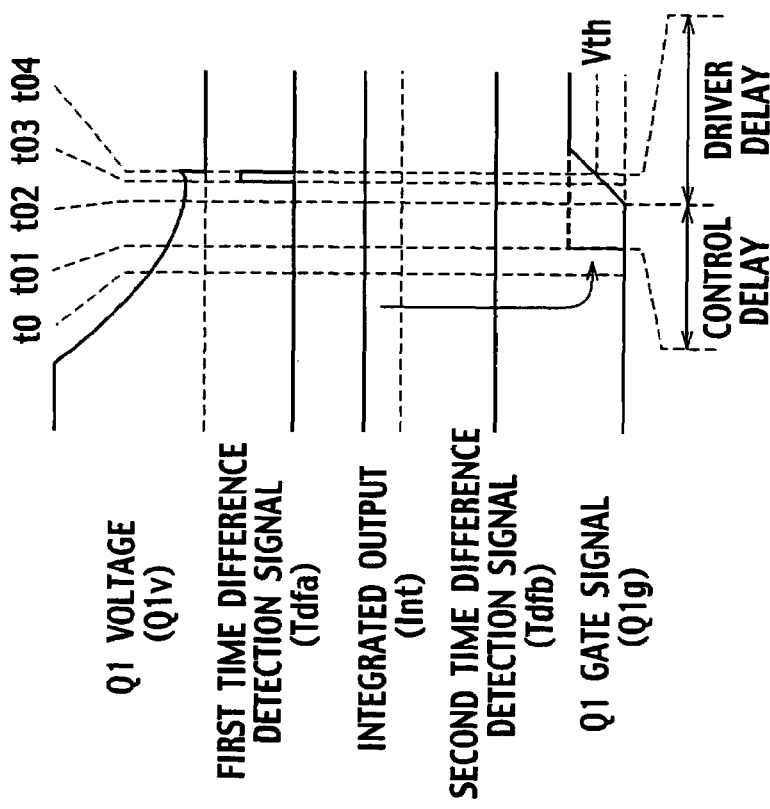

DC CONVERTER

BACKGROUND OF THE INVENTION

1. Field of the Invention

The present invention relates to a DC converter with high efficiency and low noise.

2. Description of the Related Art

FIG. 1 shows a DC converter according to a related art. The DC converter of FIG. 1 employs an active clamp method and includes a DC power source Vin, a transformer T having a primary winding P1 (the number of turns is n1) connected to the DC power source Vin, and a main switch Q1 connected to the primary winding P1. The main switch Q1 is a MOSFET (hereinafter referred to as "FET"). Ends of the primary winding P1 are connected to a series circuit consisting of an auxiliary switch Q2 and a clamp capacitor C2. The auxiliary switch Q2 is a FET. The main switch Q1 and auxiliary switch Q2 have a dead time in which both of them are OFF. The switches Q1 and Q2 are alternately turned on/off under PWM control conducted by a controller 111.

The transformer T has the primary winding P1 and a secondary winding S1 (the number of turns is n2) that are wound to generate in-phase voltages. The secondary winding S1 is connected to a rectifying/smoothing circuit including diodes D10 and D11, a reactor L10, and a capacitor C10. The rectifying/smoothing circuit rectifies and smoothes a voltage (on/off-controlled pulse voltage) induced on the secondary winding S1 of the transformer T and provides a DC output to a load 30.

Based on the output voltage to the load 30, the controller 111 generates a control pulse signal to turn on/off the main switch Q1 and auxiliary switch Q2. In addition, the controller 111 controls the duty factor of the control signal so that the output voltage maintains a predetermined value.

The DC converter further includes an inverter 112, a bottom detector 113, a first delay circuit 114, and a second delay circuit 115.

The inverter 112 inverts a Q1 control signal Q1c, which is supplied from the controller 111 to control the main switch Q1, into a Q2 control signal Q2c and supplies it to the second delay circuit 115. The bottom detector 113 detects a minimum voltage (bottom voltage) of the main switch Q1 after the auxiliary switch Q2 turns off and provides a bottom detection signal Btm indicative of the bottom voltage.

The first delay circuit 114 delays a rise of the Q1 control signal Q1c from the controller 111 until a rise of the bottom detection signal Btm from the bottom detector 113, to generate a Q1 gate signal Q1g, which is applied to the gate of the main switch Q1 to drive the main switch Q1. The second delay circuit 115 delays a rise of the Q2 control signal Q2c from the inverter 112 by a predetermined time, to generate a Q2 gate signal Q2g and applies it to the gate of the auxiliary switch Q2, thereby driving the auxiliary switch Q2.

Operation of the DC converter with the above-mentioned configuration will be explained with reference to a timing chart of FIG. 2. In FIG. 2, a voltage Q1v is a drain-source voltage of the main switch Q1.

At t30, the Q1 control signal Q1c from the controller 111 rises to a high level, and the Q2 control signal Q2c falls to a low level. As a result, the Q2 gate signal Q2g becomes low to turn off the auxiliary switch Q2. The bottom detection signal Btm is low at t30.

After the auxiliary switch Q2 is turned off, the voltage Q1v of the main switch Q1 decreases. At t31, the bottom detector 113 detects a minimum (bottom) of the voltage Q1v. As a result, the bottom detection signal Btm from the bottom detector 113 becomes high, and after a vary short period of time, becomes low.

At t32, the first delay circuit 114 raises the Q1 gate signal Q1g to high to turn on the main switch Q1, thereby achieving bottom-voltage switching, or zero-volt switching of the main switch Q1.

When the main switch Q1 is turned on, a current from the DC power source Vin passes through the primary winding P1 of the transformer T and the main switch Q1. At this time, the rectifying/smoothing circuit passes a current through a route of S1, D10, L10, C10, and S1.

At t33, the Q1 control signal Q1c falls to turn off the main switch Q1. Energy accumulated in the primary winding P1 of the transformer T and in a leakage inductance between the primary and secondary windings of the transformer T charges a parasitic capacitor (not shown) of the main switch Q1, to produce a voltage resonance. As a result, the voltage Q1v of the main switch Q1 increases during a period from t33 to t34. The rectifying/smoothing circuit passes a current through a route of L10, C10, D11, and L10 to supply the current to the load 30.

At t34, the Q2 gate signal Q2g rises to turn on the auxiliary switch Q2. Energy accumulated in the primary winding P1 of the transformer T is supplied to the clamp capacitor C2 to charge the clamp capacitor C2. Energy accumulated in the clamp capacitor C2 passes through a route of C2, Q2, P1, and C2.

SUMMARY OF THE INVENTION

According to the DC converter of the related art mentioned above, the bottom detector 113 detects a minimum voltage of the main switch Q1 after the auxiliary switch Q2 turns off. In response to the output of the bottom detector 113, a delay in a turn-on point of the main switch Q1 is controlled. If the output of the bottom detector 113 varies due to a detection error or disturbance, the delay of the main switch Q1 will fluctuate. Namely, a turn-on point of the Q1 gate signal Q1g applied to the main switch Q1 will vary to cause a phase modulation in a switching period. This severely destabilizes the operation of the DC converter.

As shown in FIG. 3, there is a delay between bottom detection at t31 and a turn-on point t32 of the main switch Q1. This delay is the sum of a control delay and a driver delay. In this case, a turn-on point of the main switch Q1 delays behind the point at which the bottom voltage occurs. It is necessary, therefore, to provide a circuit for minimizing the delay between bottom detection and a turn-on point of the main switch Q1. Also, the main switch Q1 must be turned on at high speed. This, however, increases switching noise.

According to the present invention, a DC converter capable of operating stably without regard to a bottom detection error or a bottom detection variation, eliminating the influence of a delay between a bottom detection point and a turn-on point of a main switch, and reducing a switching loss and noise in all states from a steady state to a transient state, can be provided.

According to a first technical aspect of the present invention provides a DC converter having a main switch connected in series with a primary winding of a transformer, and a series circuit connected to ends of one of the primary winding and main switch. The series circuit includes a clamp capacitor and an auxiliary switch. The main and auxiliary switches are alternately turned on/off, and a voltage of a secondary winding of the transformer is rectified and smoothed with a rectifying/smoothing circuit to provide a DC output. The DC converter includes a time difference detector to detect a time difference between a point around which the main switch provides a minimum voltage after the auxiliary switch turns off and a point at which the main switch turns on, an integrator to integrate the output of the time difference detector, and a delay control unit to control a delay in a turn-on point of the main switch according to the output of the integrator and time difference detector. The delay control unit operates to reduce the output of the time difference detector according to the output of the integrator and controls a turn-on point of the main switch in a pulse-by-pulse manner according to a pulse-by-pulse control signal generated from the output of the time difference detector.

A second technical aspect of the present invention provides a DC converter having a main switch connected in series with a primary winding of a transformer, and a series circuit connected to ends of one of the primary winding and main switch. The series circuit includes a clamp capacitor and an auxiliary switch. The main and auxiliary switches are alternately turned on/off, and a voltage of a secondary winding of the transformer is rectified and smoothed with a rectifying/smoothing circuit to provide a DC output. The DC converter includes a first time difference detector to detect a time difference between a point around which the main switch provides a minimum voltage after the auxiliary switch turns off and a point at which the main switch turns on, a second time difference detector having a lower minimum voltage detection sensitivity than the first time difference detector, to detect a time difference between a point around which the main switch provides a minimum voltage after the auxiliary switch turns off and a point at which the main switch turns on, an integrator to integrate the output of the first time difference detector, and a delay control unit to control a delay in a turn-on point of the main switch according to the outputs of the integrator and second time difference detector. The delay control unit operates to reduce the output of the first time difference detector according to the output of the integrator and controls a turn-on point of the main switch in a pulse-by-pulse manner according to a pulse-by-pulse control signal generated from the output of the second time difference detector.

A third technical aspect of the present invention provides a DC converter having a main switch connected in series with a primary winding of a transformer, and a series circuit connected to ends of one of the primary winding and main switch. The series circuit includes a clamp capacitor and an auxiliary switch. The main and auxiliary switches are alternately turned on/off, and a voltage of a secondary winding of the transformer is rectified and smoothed with a rectifying/smoothing circuit to provide a DC output. The DC converter includes a time difference detector to detect a time difference between a point around which the main switch provides a minimum voltage after the auxiliary switch turns off and a point at which the main switch turns on, an integrator to integrate an output of the time difference detector, a first voltage change detector to detect a temporal change in the voltage of the main switch, and a delay control unit to control a delay in a turn-on point of the main switch according to the outputs of the integrator and first voltage change detector. The delay control unit operates to reduce the output of the time difference detector according to the output of the integrator and controls a turn-on point of the main switch in a pulse-by-pulse manner according to a pulse-by-pulse control signal generated from the output of the first voltage change detector.

A fourth technical aspect of the present invention provides a DC converter having a main switch connected in series with a primary winding of a transformer, and a series circuit connected to ends of one of the primary winding and main switch. The series circuit includes a clamp capacitor and an auxiliary switch. The main and auxiliary switches are alternately turned on/off, and a voltage of a secondary winding of the transformer is rectified and smoothed with a rectifying/smoothing circuit to provide a DC output. The DC converter includes a time difference detector to detect a time difference between a point around which the main switch provides a minimum voltage after the auxiliary switch turns off and a point at which the main switch turns on, an integrator to integrate the output of the time difference detector, a voltage detector to detect a voltage of the main switch, and a delay control unit to control a delay in a turn-on point of the main switch according to the outputs of the integrator and voltage detector. The delay control unit operates to reduce the output of the time difference detector according to the output of the integrator and controls a turn-on point of the main switch in a pulse-by-pulse manner according to a pulse-by-pulse control signal generated from the output of the voltage detector.

BRIEF DESCRIPTION OF THE DRAWINGS

FIG. 5 is a timing chart showing signals at various parts of the DC converter of the first embodiment in a steady state;

FIG. 6 is an enlarged waveform diagram showing several signals in a period from a point to turn off an auxiliary switch and a point to turn on a main switch in the DC converter of the first embodiment;

FIG. 14 is a circuit diagram showing a JKFF in the example 2 of the time difference detector shown in FIG. 11;

FIG. 15 is a table showing a logic table of the JKFF shown in FIG. 14;

FIG. 16 is a circuit diagram showing an example 1 of an integrator in the DC converter of the first embodiment shown in FIG. 4;

FIGS. 21A to 21C are timing charts showing signals at various parts of the DC converter of the second embodiment in a steady state 1, a steady state 2, and a steady state 3, respectively;

DESCRIPTION OF THE PREFERRED EMBODIMENT

DC converters according to embodiments of the present invention will be explained in detail with reference to the drawings.

First Embodiment

Figure 1:
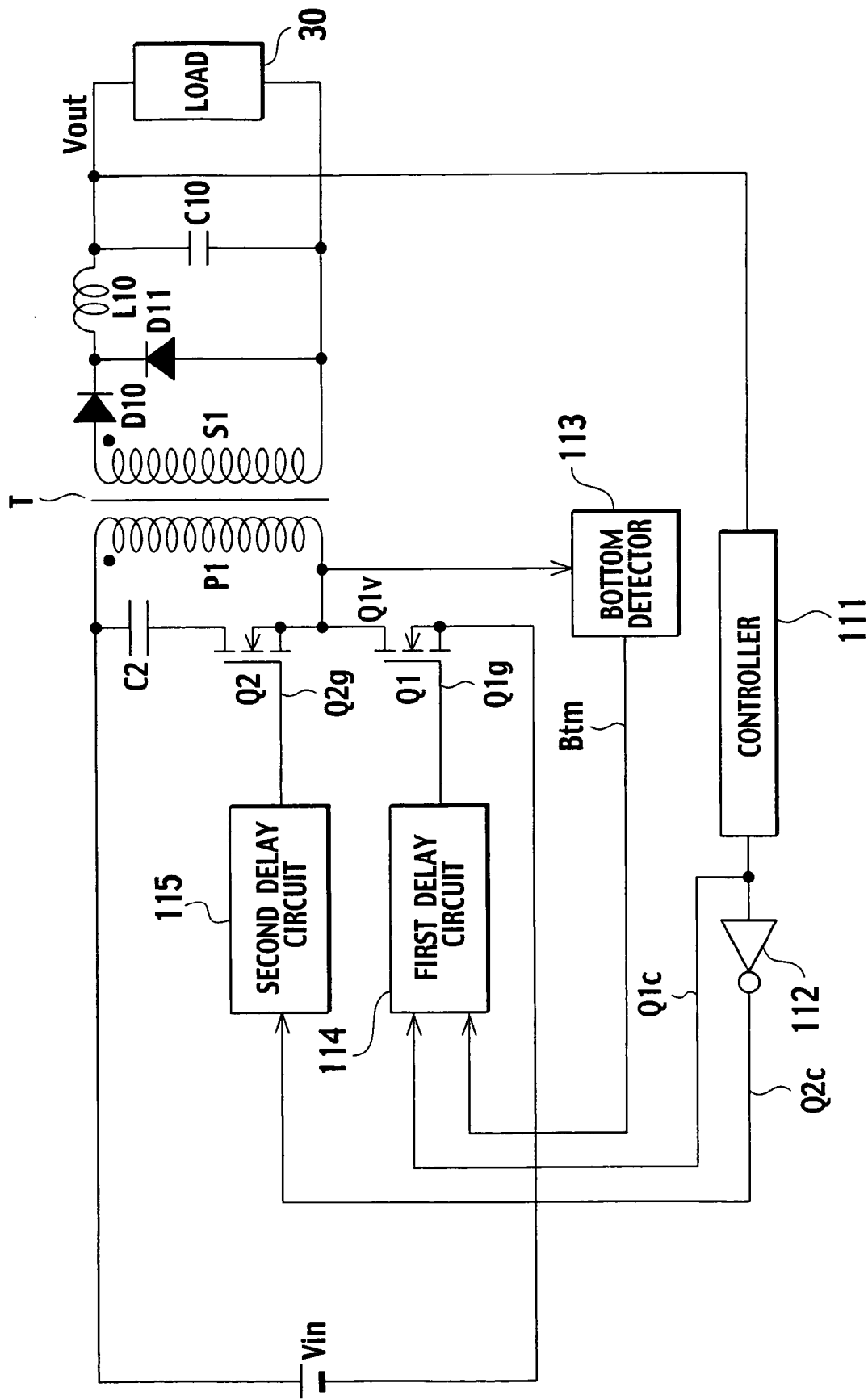
FIG. 1 is a circuit diagram showing a DC converter according to a related art.
Figure 2:
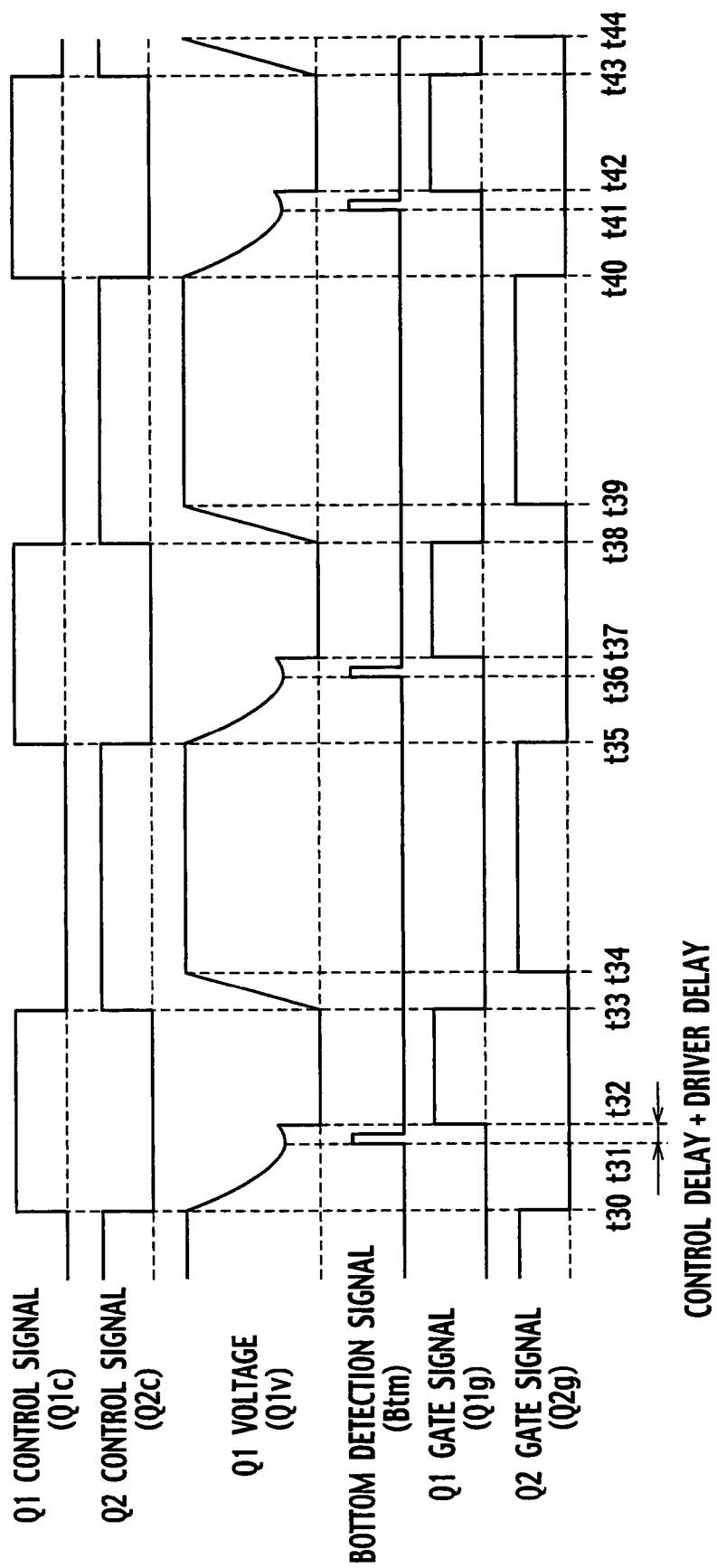
FIG. 2 is a timing chart showing signals at various parts of the DC converter according to the related art.
Figure 3:
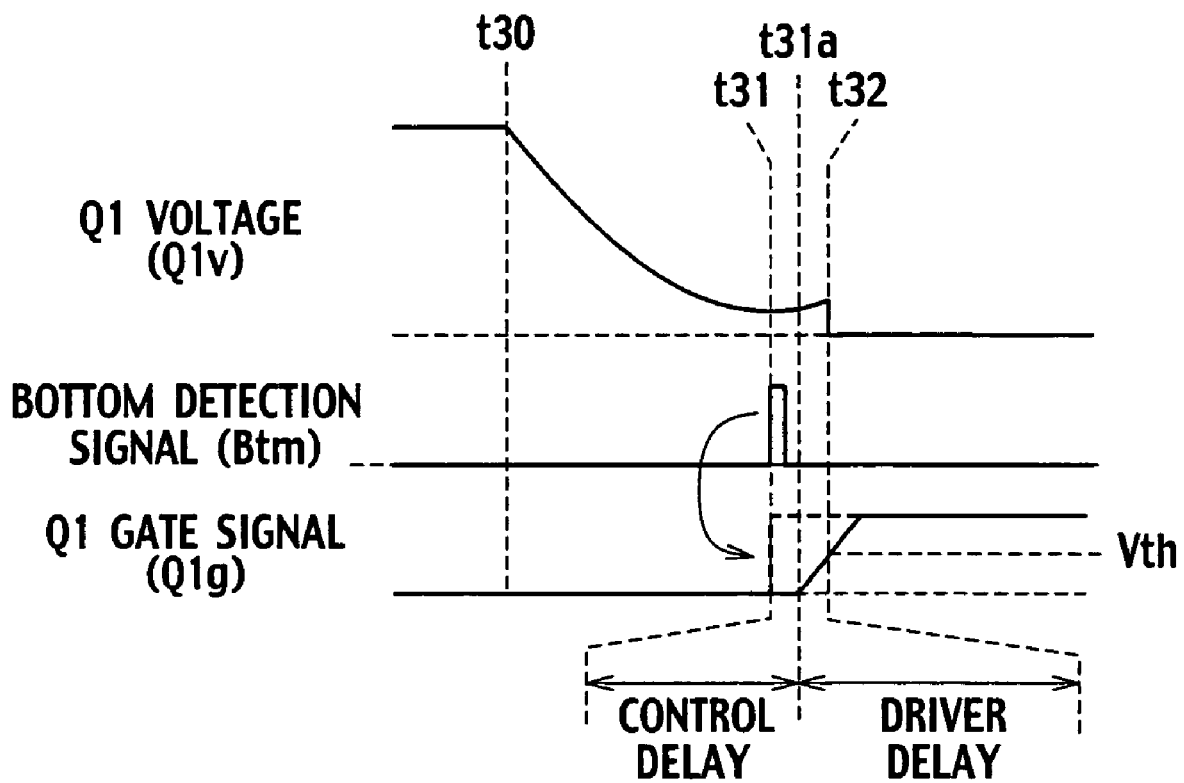
FIG. 3 is an enlarged waveform diagram showing several signals in a period from a point to turn off an auxiliary switch and a point to turn on a main switch in the DC converter according to the related art.
Figure 4:
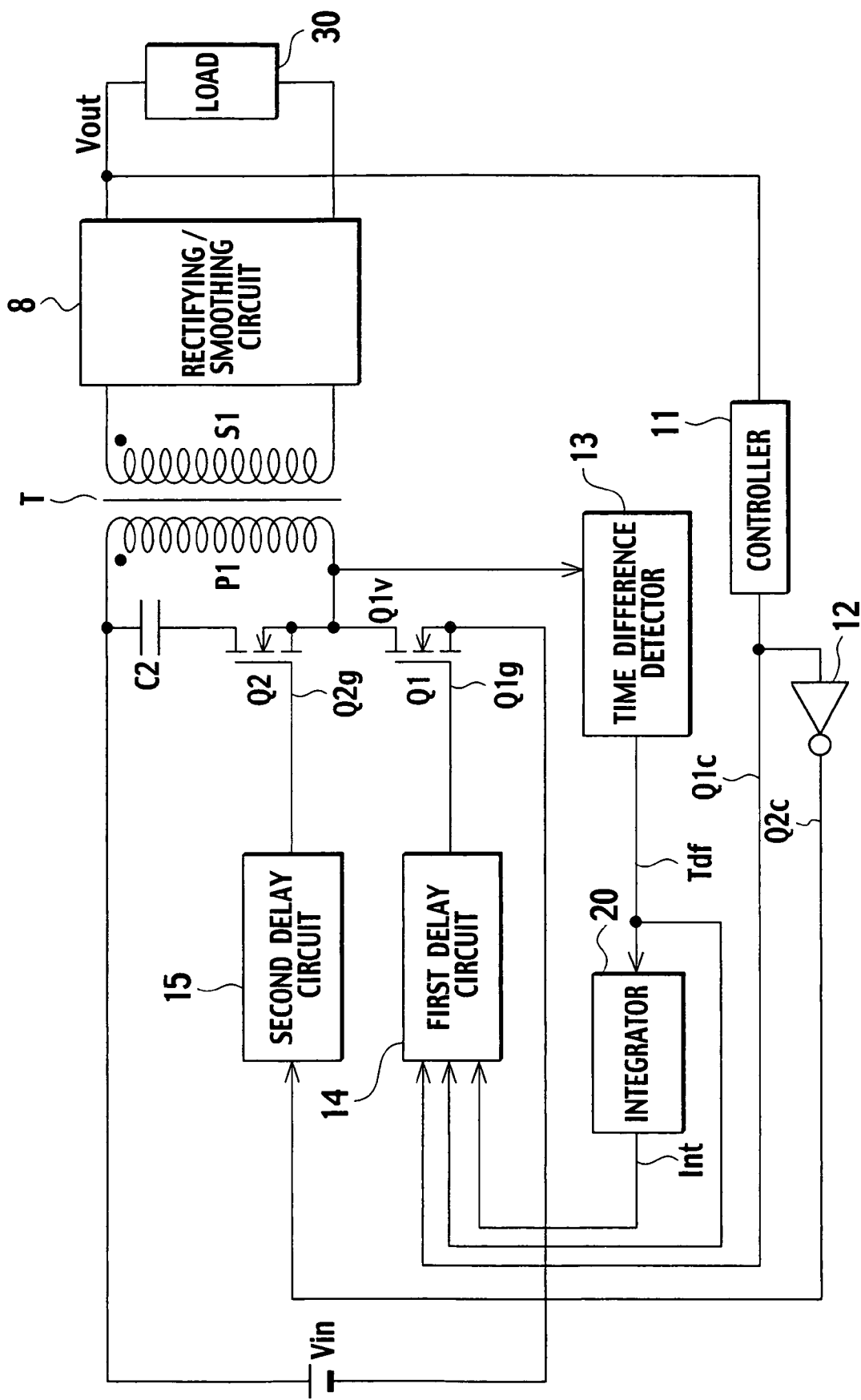
FIG. 4 is a circuit diagram showing a DC converter according to an first embodiment of the present invention.

FIG. 4 is a circuit diagram showing a DC converter according to the first embodiment of the present invention. In FIG. 4, parts corresponding to those of FIG. 1 are represented with the same reference numerals.

In the DC converter of FIG. 4, a DC power source Vin is connected through a primary winding P1 of a transformer T to a main switch Q1 that is a FET. Ends of the primary winding P1 are connected to a series circuit including an auxiliary switch Q2 that is a FET and a clamp capacitor C2. The main switch Q1 and auxiliary switch Q2 have a dead time in which the switches Q1 and Q2 are OFF. The switches Q1 and Q2 are alternately turned on/off under PWM control carried out by a controller 11.

The primary winding P1 and a secondary winding S1 of the transformer are wound to generate in-phase voltages. The secondary winding S1 is connected to a rectifying/smoothing circuit 8, so that a voltage (on/off-controlled pulse voltage) induced on the secondary winding S1 is rectified and smoothed with the rectifying/smoothing circuit 8 to provide a DC output to a load 30.

Based on the output voltage to the load 30, the controller 11 generates a control pulse signal to turn on/off the main switch Q1 and auxiliary switch Q2. At the same time, the controller 11 controls the duty factor of the control signal so that the output voltage maintains a predetermined value.

The DC converter further includes an inverter 12, a time difference detector 13, a first delay circuit 14, a second delay circuit 15, and an integrator 20.

The inverter 12 inverts a Q1 control signal Q1c, which is supplied from the controller 11 for controlling the main switch Q1, into a Q2 control signal Q2c and supplies it to the second delay circuit 15. The time difference detector 13 detects a time difference between a point around which the main switch Q1 provides a minimum voltage (bottom level) Q1v after the auxiliary switch Q2 turns off and a point at which the main switch Q1 turns on and outputs a time difference detection signal Tdf to the integrator 20 and first delay circuit 14. The integrator 20 integrates (averages) the time difference detection signal Tdf from the time difference detector 13 and provides an integrated output Int.

The first delay circuit 14 corresponds to the delay control unit of the present invention. The first delay circuit 14 receives the integrated output Int from the integrator 20, the time difference detection signal Tdf from the time difference detector 13, and the Q1 control signal Q1c from the controller 11. Based on the values of the integrated output Int from the integrator 20 and the time difference detection signal Tdf from the time difference detector 13, the first delay circuit 14 controls a turn-on point of the main switch Q1 at which the Q1 gate signal Q1g is applied to the gate of the main switch Q1 to drive the main switch Q1. Based on the integrated output Int from the integrator 20, the first delay circuit 14 controls the time difference detection signal Tdf of the time difference detector 13 such that the signal Tdf becomes smaller. Based on a pulse-by-pulse control signal generated from the time difference detection signal Tdf, the first delay circuit 14 controls a turn-on point of the main switch Q1 in a pulse-by-pulse manner.

After the main switch Q1 turns off, the second delay circuit 15 generates a Q2 gate signal Q2g by delaying a rise of the Q2 control signal Q2c from the inverter 12 by a predetermined time and applies the Q2 gate signal Q2g to the gate of the auxiliary switch Q2 to drive the auxiliary switch Q2.

Operation of the DC converter according to the first embodiment will be explained with reference to a timing chart of FIG. 5.

At time t0, the Q1 control signal Q1c from the controller 11 changes to high, and the Q2 control signal Q2c changes to low. As a result, the Q2 gate signal Q2 becomes low to turn off the auxiliary switch Q2. In a period T1 from t0 to t1, the voltage Q1v of the main switch Q1 decreases.

At t1, the voltage Q1v of the main switch Q1 reaches a minimum (bottom) level, which is detected by the time difference detector 13. The time difference detector 13 then raises the time difference detection signal Tdf to high.

At time t2, the first delay circuit 14 changes the Q1 gate signal Q1g to high to turn on the main switch Q1. The time difference detector 13 detects when the main switch Q1 turns on, and at t2, changes the time difference detection signal Tdf to low. Namely, the time difference detection signal Tdf from the time difference detector 13 is high during a period T2 from t1 to t2. The time difference detection signal Tdf is integrated in the integrator 20, which provides the integrated output Int to the first delay circuit 14.

The first delay circuit 14 controls a delay time of the main switch Q1 according to the integrated output Int from the integrator 20. With the averaging or smoothing effect of integration achieved by the integrator 20, delay control by the first delay circuit 14 is stable irrespective of slight fluctuations in the time difference detection signal Tdf from the time difference detector 13 that may be caused by disturbance or detection sensitivity variations.

At time t3, the Q1 gate signal Q1g to the main switch Q1 becomes low. The voltage Q1v of the main switch Q1 increases to reach a voltage of the clamp capacitor C2. At time t4, the second delay circuit 15 provides the delayed Q2 gate signal Q2g to turn on the auxiliary switch Q2.

FIG. 6 is an enlarged waveform diagram showing several signals in a period from a point to turn off the auxiliary switch Q2 to a point to turn on the main switch Q1. According to the first embodiment, the time difference detector 13 detects a time difference between a point at which the main switch Q1 provides a minimum voltage and a point at which the main switch Q1 turns on, and provides the time difference detection signal Tdf representative of the detected time difference. The integrator 20 averages the time difference detection signal Tdf and provides the integrated output Int. Based on the integrated output Int, the first delay circuit 14 controls a turn-on point of the main switch Q1. With this configuration, the first embodiment can correct a control delay and a driver delay in the DC converter.

With reference to FIG. 6, operation of controlling a turn-on point of the main switch Q1 will be explained. At time t0, the voltage Q1v of the main switch Q1 starts to decrease, and at t03, reaches a minimum (bottom) level. At time t04, the main switch Q1 turns on.

To turn on the main switch Q1 at t04, what must be considered are a delay (control delay) in the controller 11 and a delay (driver delay) between a point at which the Q1 gate signal Q1g is applied to the main switch Q1 and a point at which the gate voltage of the main switch Q1 reaches a threshold Vth. Due to these delays, the Q1 gate signal Q1g shown in FIG. 6 must rise at t01 before the minimum voltage of the main switch Q1 appears, as indicated with a dotted line in FIG. 6. To turn on the main switch Q1 at the minimum voltage, it is necessary to estimate the time point at which the minimum voltage appears.

According to the first embodiment, the time difference detection signal Tdf from the time difference detector 13 is integrated/averaged by the integrator 20, which provides the averaged output Int. Based on the averaged output Int, the first delay circuit 14 controls a turn-on point of the main switch Q1 in such a way that a given pulse width from the time difference detection signal Tdf should be deleted. Consequently, the Q1 gate signal Q1g (rising at t01 as indicated with a dotted line in FIG. 6) is provided before the point when the main switch Q1 provides a minimum voltage. The time difference detector 13 detects the time difference between a point when the main switch Q1 provides a minimum voltage and a point when the main switch Q1 actually turns on. As a result, the actual turn-on point of the main switch Q1 can be brought close to the point when the main switch Q1 provides the minimum voltage.

The first delay circuit 14 turns on the main switch Q1 in a pulse-by-pulse manner in response to a pulse-by-pulse control signal that is based on the time difference detection signal Tdf from the time difference detector 13. In a steady state shown in FIG. 6, the Q1 gate signal Q1g is outputted before a rise of the time difference detection signal Tdf of the time difference detector 13. In a steady state, therefore, no pulse-by-pulse control takes place. Namely, there is no pulse-by-pulse control signal.

In a transient state that may occur at the start of the DC converter or due to a sudden change in an input voltage or load, the resonance frequency of the main switch Q1 may suddenly change after the auxiliary switch Q2 turns off. In such a case, the Q1 gate signal Q1g may be outputted after a rise of the time difference detection signal Tdf. Then, the pulse-by-pulse control takes place to turn on the main switch Q1 with a pulse-by-pulse control signal.

Figure 7A:
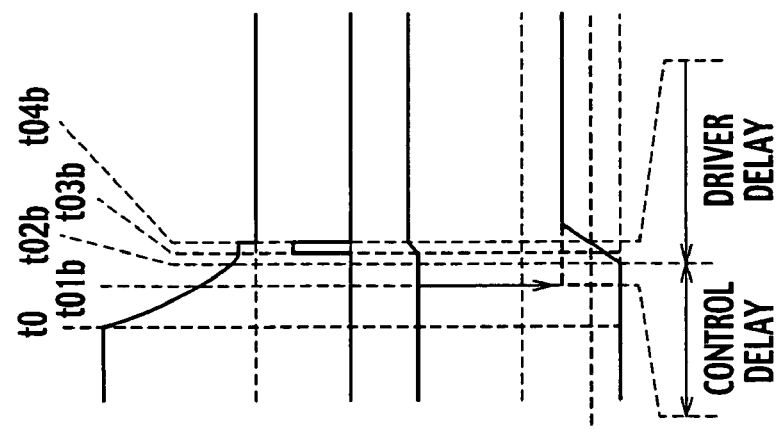
FIGS. 7A to 7C are timing charts showing signals at various parts of the DC converter of the first embodiment in a steady state 1, a transient state, and a steady state 2, respectively.
Figure 7B:
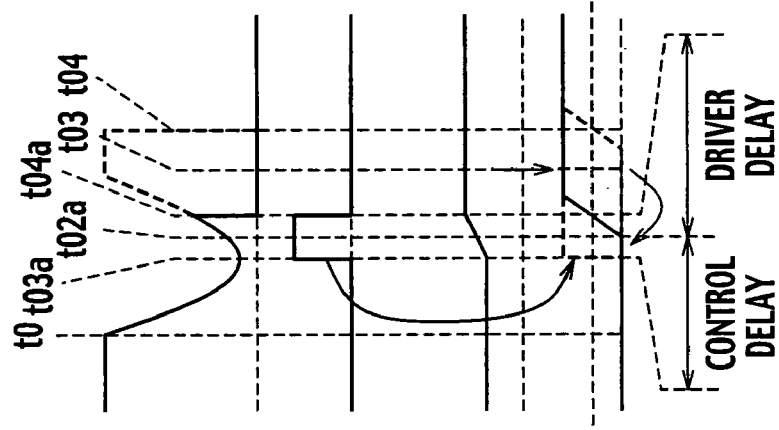
Figure 7C:
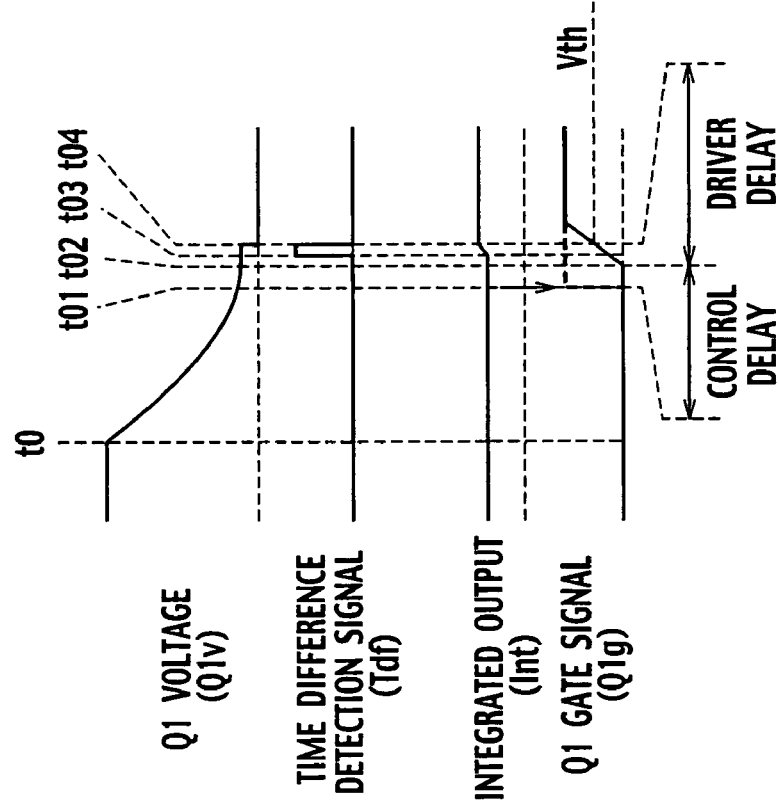

FIGS. 7A to 7C are timing charts showing signals at various parts of the DC converter of the first embodiment in a steady state 1, a transient state, and a steady state 2, respectively. After the auxiliary switch Q2 turns off, the voltage Q1v of the main switch Q1 resonates and decreases. The states shown in FIGS. 7A to 7C are a case in which the resonance frequency of the main switch Q1 suddenly changes in the transient state. Namely, the main switch Q1 rapidly changes from the steady state 1 of FIG. 7A with a low resonance frequency to the steady state 2 of FIG. 7C with a high resonance frequency through the transient state 7B.

In the steady state 1, the auxiliary switch Q2 turns off at t0. At time t01, the first delay circuit 14 provides an ON signal to turn on the main switch Q1, and after the control delay and driver delay, the main switch Q1 turns on at t04. The time difference detector 13 detects a time difference between a point at which the main switch Q1 reaches a minimum voltage and the point at which the main switch Q1 turns on. This time difference corresponds to a period from t03 to t04.

The Q1 gate signal Q1g (depicted by a dotted line) is provided at t01 by the first delay circuit 14 according to the integrated output Int from the integrator 20, to control a turn-on point of the main switch Q1. The integrated output Int is equal to an average of the time detection signal Tdf from the time difference detector 13. In the steady state 2, the same control as that in the steady state 1 is carried out although the resonance frequency of the main switch Q1 is high in the steady state 2.

When the steady state 1 abruptly changes to the steady state 2, the resonance frequency of the main switch Q1 suddenly changes to turn on the main switch Q1 at t04 if no pulse-by-pulse control is carried out. In this case, the voltage Q1v of the main switch Q1 will oscillate as depicted by a dotted waveform (FIG. 7B).

To avoid this, if the time difference detection signal Tdf from the time difference detector 13 rises at t03*a* (the transition state of FIG. 7B) before a rise (t03) of the Q1 gate signal Q1*g* from the first delay circuit 14, the first delay circuit 14 outputs the Q1 gate signal Q1*g* in a pulse-by-pulse manner according to the integrated output Int of the integrator 20 and a pulse-by-pulse control signal based on the time difference detection signal Tdf from the time difference detector 13. Namely, the Q1 gate signal Q1*g* (dotted line) is outputted at t03*a* to turn on the main switch Q1 at t04*a* after the control delay and driver delay. As a result, the oscillation of the voltage Q1*v* as shown by the dotted line of FIG. 7B does not occur.

Examples of basic circuits arranged in the DC converter of the first embodiment of FIG. 4 will be explained.

Figure 8:
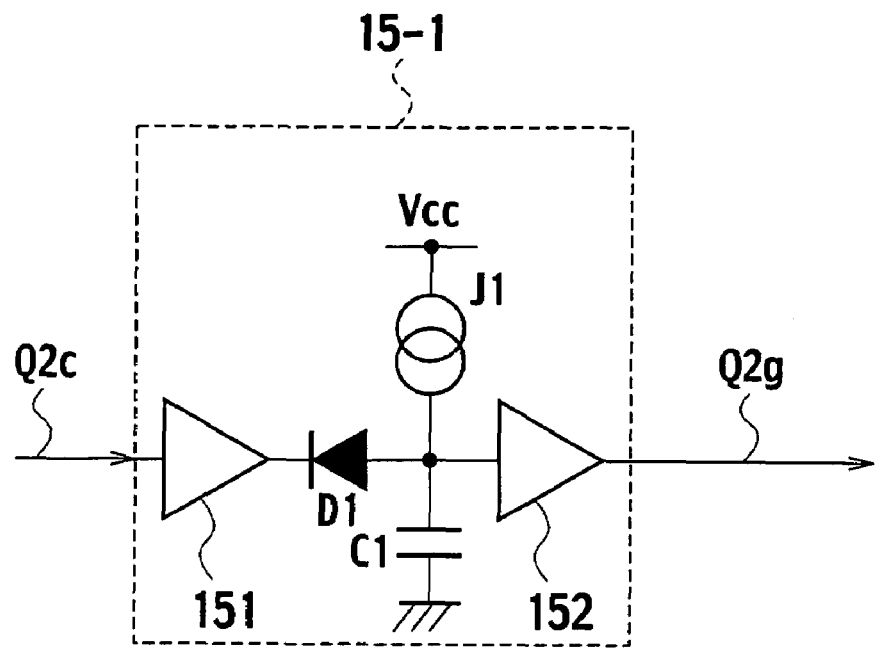
FIG. 8 is a circuit diagram showing an example 1 of a second delay circuit in the DC converter of the first embodiment shown in FIG. 4.

FIG. 8 shows an example 1 of the second delay circuit 15 arranged in the DC converter of the first embodiment of FIG. 4. In FIG. 8, the second delay circuit 15-1 controls a delay time for the auxiliary switch Q2. In the second delay circuit 15-1, the output (Q2 control signal Q2*c*) of the inverter 12 is connected through a buffer 151 to the cathode of a diode D1. The anode of the diode D1 is connected to a first end of a capacitor C1 and a first end of a constant current source J1. A second end of the constant current source J1 is connected to a power source Vcc. A second end of the capacitor C1 is grounded. A node between the constant current source J1 and the capacitor C1 is connected through a buffer 152 to the gate of the auxiliary switch Q2.

Figure 9:
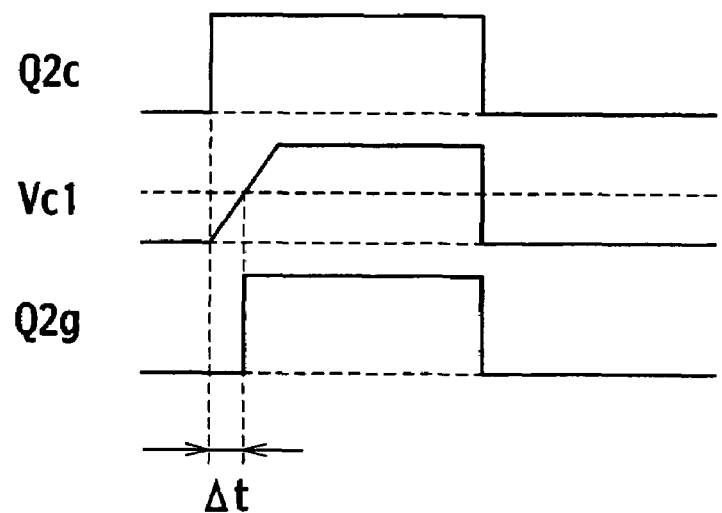
FIG. 9 is a waveform diagram showing operation of the second delay circuit of FIG. 8.

FIG. 9 is a waveform diagram showing operation of the second delay circuit 15-1 of FIG. 8. The Q2 control signal Q2*c* that is high in FIG. 9 is supplied through the buffer 151 to the cathode of the diode D1 to put the diode D1 in a reverse bias state. As a result, a current from the power source Vcc passes through the constant current source J1 to the capacitor C1, to charge the capacitor C1. As a result, a rise of the Q2 gate signal Q2*g* generated by the second delay circuit 15-1 is delayed by a delay time that is determined by a time constant of the constant current source J1 and capacitor C1.

The Q2 gate signal Q2*g* is applied through the buffer 152 to the gate of the auxiliary switch Q2 to turn on the auxiliary switch Q2. In this way, with the constant current source J1 and capacitor C1, the second delay circuit 15-1 delays a given signal by a predetermined delay time.

Figure 10:
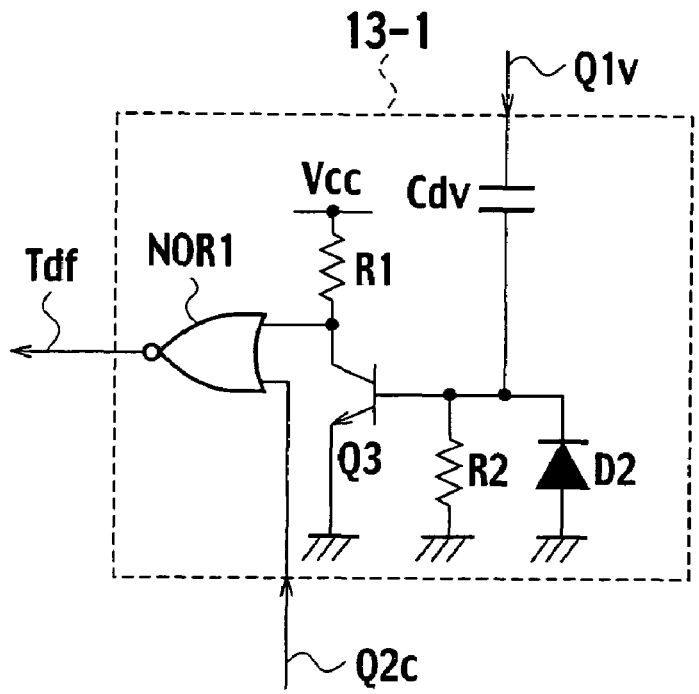
FIG. 10 is a circuit diagram showing an example 1 of a time difference detector in the DC converter of the first embodiment shown in FIG. 4.

FIG. 10 is a circuit diagram showing an example 1 of the time difference detector 13 arranged in the DC converter of the first embodiment of FIG. 4. In the time difference detector 13-1 of FIG. 10, a transistor Q3 has a base connected to the cathode of a diode D2, a first end of a resistor R2, and a first end of a capacitor Cdv. The emitter of the transistor Q3 is grounded. The collector of the transistor Q3 is connected to a first end of a resistor R1 and a first input terminal of a NOR gate NOR1. A second end of the resistor R1 is connected to the power source Vcc. A second input terminal of the NOR gate NOR1 is connected to the output terminal of the inverter 12. An output terminal of the NOR gate NOR1 is connected to the integrator 20. The anode of the diode D2 and a second end of the resistor R2 are grounded.

In the time difference detector 13-1, a second end of the capacitor Cdv is connected to the main switch Q1, the first end of the capacitor Cdv is connected to the base of the transistor Q3, and the diode D2 is connected between the base and emitter of the transistor Q3 so that no reverse current passes between the base and emitter of the transistor Q3. The resistor R2 connected between the base and emitter of the transistor Q3 is configured to adjust detection sensitivity for detecting a minimum (bottom) level.

If the resistor R2 is open in FIG. 10 and when the voltage Q1*v* of the main switch Q1 decreases, a current passes through a route of Cdv, P1, Vin, D2, and Cdv to turn off the transistor Q3. The voltage Q1*v* of the main switch Q1 reaches a minimum voltage and starts to increase. Then, a current passes through a route of Cdv, Q3 (B), Q3 (E), Vin, P1, and Cdv to turn on the transistor Q3. At this time, the NOR gate NOR1 receives a low level, and therefore, the NOR gate NOR1 provides a high-level output.

When the main switch Q1 turns on, the voltage Q1*v* of the main switch Q1 becomes a ground level to pass no current therethrgough. As a result, the transistor Q3 turns off, and the NOR gate NOR1 receives a high-level input and provides a low-level output. Consequently, the time difference detector 13-1 can detect a time difference between the point at which the main switch Q1 provides a minimum voltage and the point at which the main switch Q1 turns on.

This arrangement may detect a period in which a transient change dV/dt of the voltage Q1*v* after the main switch Q1 turns off is positive. In order not to detect an OFF period of the main switch Q1, the NOR gate NOR1 uses the Q2 control signal Q2*c* to mask the signal supplied from the collector of the transistor Q3.

The capacitor Cdv may be realized by connecting the diode D2 in a reverse bias state and by using a capacitive element such as a junction capacitance of the reverse bias state. In FIG. 10, the resistor R2 may be arranged between the power source Vcc and the base of the transistor Q3.

In the time difference detector 13-1 of FIG. 10, the resistor R2 is connected between the base and emitter of the transistor Q3, to detect a positive temporal change dV/dt of the voltage Q1*v*. If the resistor R2 is open (infinite resistance), the time difference detector 13-1 detects a temporal change in the voltage Q1*v* between a minimum voltage (dV/dt=0) and a point when the main switch Q1 turns on.

In the time difference detector 13-1 of FIG. 10, the resistor R2 may be connected between the power source Vcc and the base of the transistor Q3 to pass a bias current through the transistor Q3. In this case, the transistor Q3 turns on before the main switch Q1 reaches a minimum voltage. After the main switch Q1 turns on, the transistor Q3 is continuously ON due to the resistor R2. Accordingly, an ON detector 21 should be provided to detect when the main switch Q1 turns on.

Figure 11:
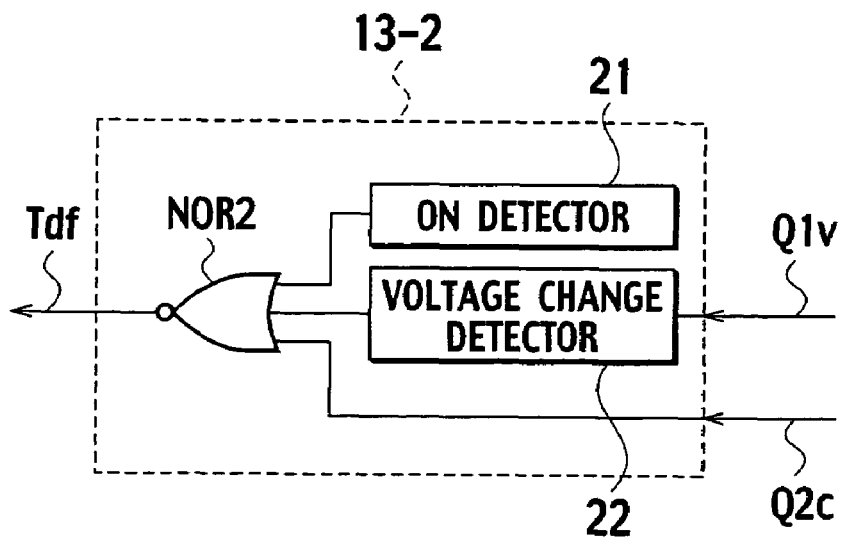
FIG. 11 is a circuit diagram showing an example 2 of the time difference detector in the DC converter of the first embodiment shown in FIG. 4.

FIG. 11 is a circuit diagram showing an example 2 of the time difference detector 13 arranged in the DC converter of the first embodiment shown in FIG. 4. The time difference detector 13-2 includes an ON detector 21 to detect when the main switch Q1 turns on, a voltage change detector 22 to detect a transient change dV/dt in the voltage Q1*v* of the main switch Q1, and a NOR gate NOR2 to provide, as the time difference detection signal Tdf, a NOR of the output of the ON detector 21, the output-of the voltage change detector 22, and the Q2 control signal Q2*c*. The time difference detection signal Tdf indicates a time difference between a point before a minimum voltage of the main switch Q1 and a point when the main switch Q1 turns on.

Figure 12:
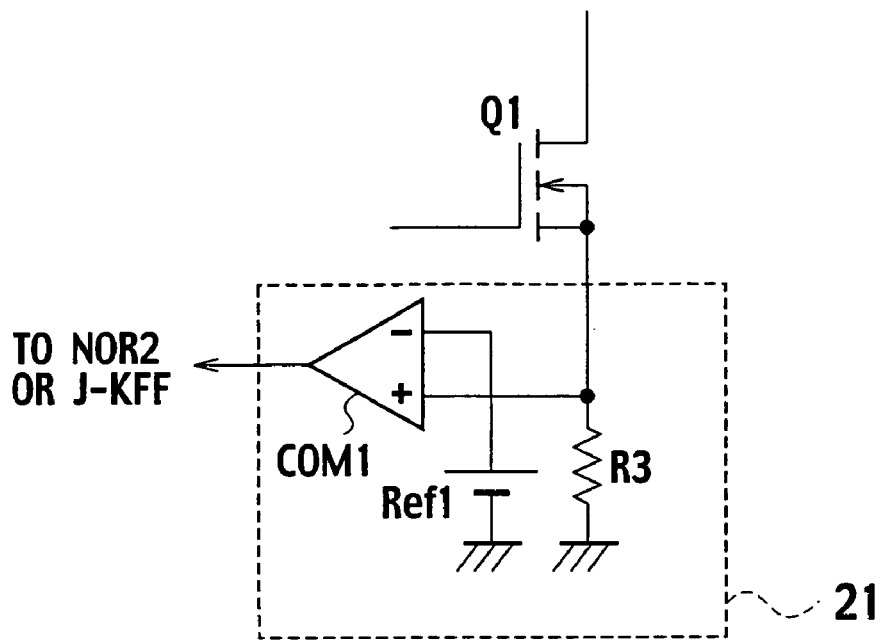
FIG. 12 is a circuit diagram showing an example 1 of an ON detector shown in FIG. 11.

FIG. 12 is a circuit diagram showing an example 1 of the ON detector 21 shown in FIG. 11. In the ON detector 21 of FIG. 12, a comparator COM1 has an inverting input terminal (−) connected to a reference power source Ref1 and a non-inverting input terminal (+) connected to a node between the source of the main switch Q1 and a resistor R3. An output terminal of the comparator COM1 is connected to the NOR gate NOR2 of FIG. 11.

When the main switch Q1 turns on to pass a current through the main switch Q1, the resistor R3 connected to the source of the main switch Q1 generates a terminal voltage, which is supplied to the non-inverting input terminal (+) of the comparator COM1. Comparing this voltage with the reference power source Ref1, the comparator COM1 provides a high-level ON signal. In this way, adding the resistor R3 to the main switch Q1 can detect when the main switch Q1 turns on. Instead, the main switch Q1 may incorporate a sense MOSFET being capable of detecting a current.

Figure 13:
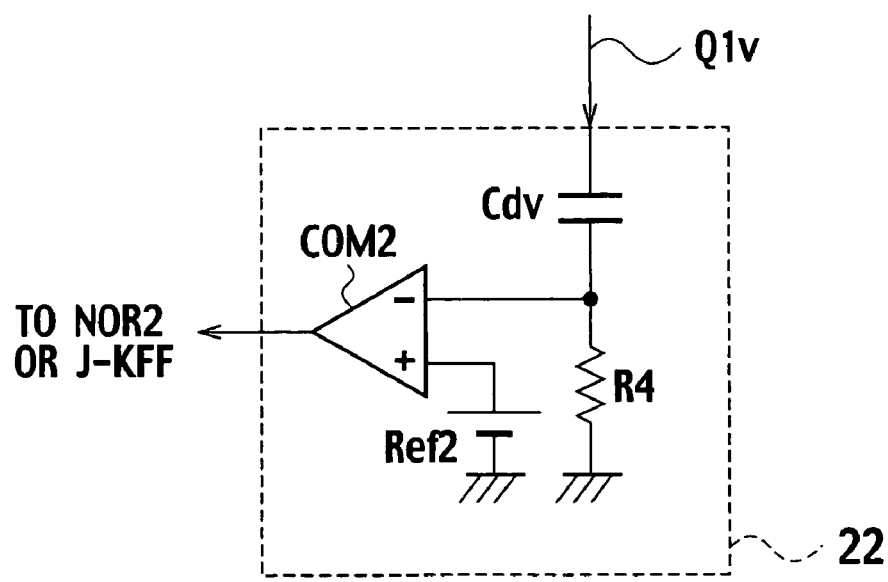
FIG. 13 is a circuit diagram showing an example 1 of a voltage change detector shown in FIG. 11.

FIG. 13 is a circuit diagram showing an example 1 of the voltage change detector 22 shown in FIG. 11. In the voltage change detector 22 of FIG. 13, a comparator COM2 has a non-inverting input terminal (+) connected to a reference power source Ref2 and an inverting input terminal (−) connected to a node between a capacitor Cdv and a resistor R4. An output terminal of the comparator COM2 is connected to the NOR gate NOR2 of FIG. 11.

In FIG. 13, the reference power source Ref2 provides a negative voltage to quickly detect a minimum voltage of the main switch Q1. The capacitor Cdv may be realized by connecting a diode in a reverse bias state and by using a capacitive element such as a junction capacitance of the reverse bias state.

FIG. 14 is a circuit diagram showing a JK flip-flop (JKFF) in the example 2 of the time difference detector 13-2 shown in FIG. 11. FIG. 15 is a table showing a logic table of the JKFF. In FIG. 14, a terminal J is connected to the power source Vcc, a reset terminal R receives the output of the comparator COM1, a clock terminal CK receives the output of the comparator COM2, a set terminal S is grounded, a terminal K is grounded, and a terminal Q provides the time difference detection signal Tdf. This JKFF can generate the time difference detection signal Tdf without employing the Q2 control signal Q2c.

As mentioned above, the time difference detector 13-2 consists of the voltage change detector 22 and the ON detector 21 to detect when the main switch Q1 turns on.

FIG. 16 is a circuit diagram showing an example 1 of the integrator 20 arranged in the DC converter of the first embodiment shown in FIG. 4. In the integrator 20-1 of FIG. 16, a resistor R6 and a capacitor C3 are connected in series with each other. A first end of the capacitor C3 is grounded. A node between the resistor R6 and the capacitor C3 provides the integrated output Int to the first delay circuit 14.

The present invention detects a time difference between a point at which the main switch Q1 provides a minimum voltage and a point at which the main switch Q1 turns on, to control the main switch Q1 so as to eliminate the time difference. For this, the integrator 20-1 of FIG. 16 charges the capacitor C3 in a short time and discharges the same in a long time. This control may be insufficient to accurately carry out an integration operation. For PFM (pulse frequency modulation) control, the discharge period is too long to secure accuracy.

Figure 17:
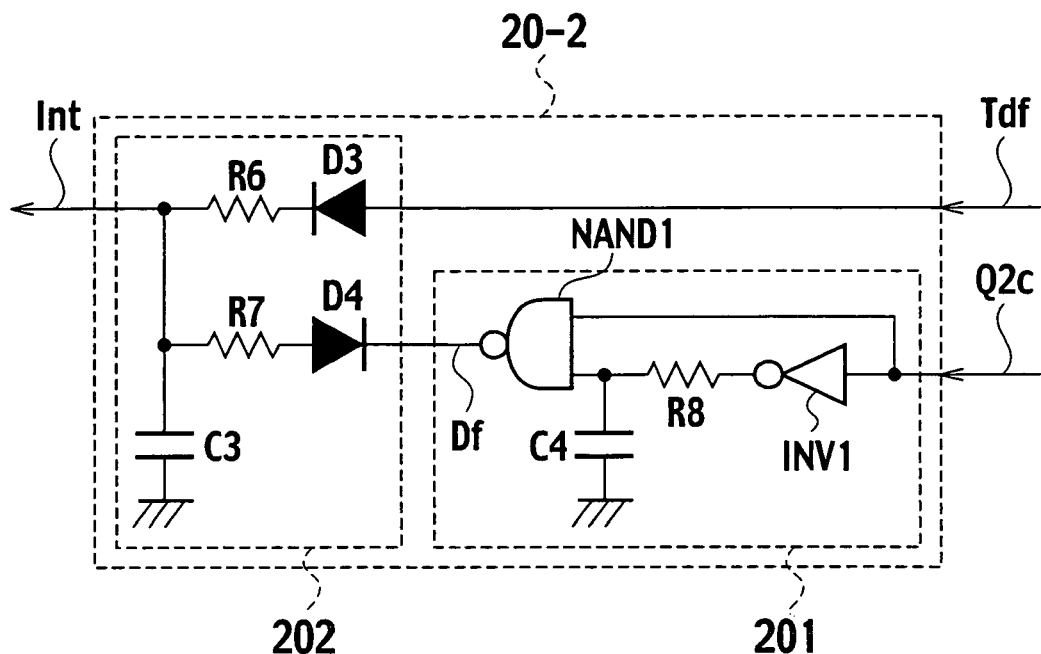
FIG. 17 is a circuit diagram showing an example 2 of the integrator in the DC converter of the first embodiment shown in FIG. 4.

FIG. 17 is a circuit diagram showing an example 2 of the integrator 20 arranged in the DC converter of the first embodiment shown in FIG. 4. The integrator 20-2 of FIG. 17 can accurately integrate short pulses and secure correctness for PFM control that modulates the switching frequency of the main switch Q1.

The integrator 20-2 of FIG. 17 includes a pulse generator 201 and an operation circuit 202. The pulse generator 201 is a differential circuit to detect a rising edge of the Q2 control signal Q2c from the inverter 12. In the pulse generator 201, a first input terminal of a NAND gate NAND1 is connected to the inverter 12 and a second input terminal thereof is connected through an integration circuit, which consists of a resistor R8 and a capacitor C4, and an inverter INV1 to the inverter 12. The pulse generator 201 generates a differential signal Df of low level having a pulse width determined by a time constant of the resistor R8 and capacitor C4. The differential signal Df is supplied to the operation circuit 202. The pulse generator 201 corresponds to the first operation unit of the present invention that subtracts a predetermined value from an addition result provided by the operation circuit 202 at intervals of an on/off period of the main switch Q1.

The operation circuit 202 corresponds to the second operation unit of the present invention that conducts an addition operation on the output of the time difference detector 13. In the operation circuit 202, the cathode of a diode D3, a resistor R6, and a first end of a capacitor C3 are connected in series. The anode of the diode D3 is connected to the output terminal of the time difference detector 13. A second terminal of the capacitor C3 is grounded. A node between the resistor R6 and the capacitor C3 is connected to a first end of a resistor R7. A second end of the resistor R7 is connected to the anode of a diode D4. The cathode of the diode D4 is connected to an output terminal of the NAND gate NAND1 of the pulse generator 201. The integrated output Int is provided from the node between the resistor R6 and the capacitor C3 to the first delay circuit 14.

The output of the time difference detector 13 charges the capacitor C3 through the resistor R6 and diode D3. The pulse generator 201 generates a pulse at intervals of a switching period, to discharge the capacitor C3 by a given amount through the resistor R7 and diode D4. This configuration can correctly integrate short pulses, to cause no error for PFM control. Instead of the resistor R6 serving as an addition unit and the resistor R7 serving as a subtraction unit shown in FIG. 17, constant current sources may be employed to improve accuracy.

Figure 18:
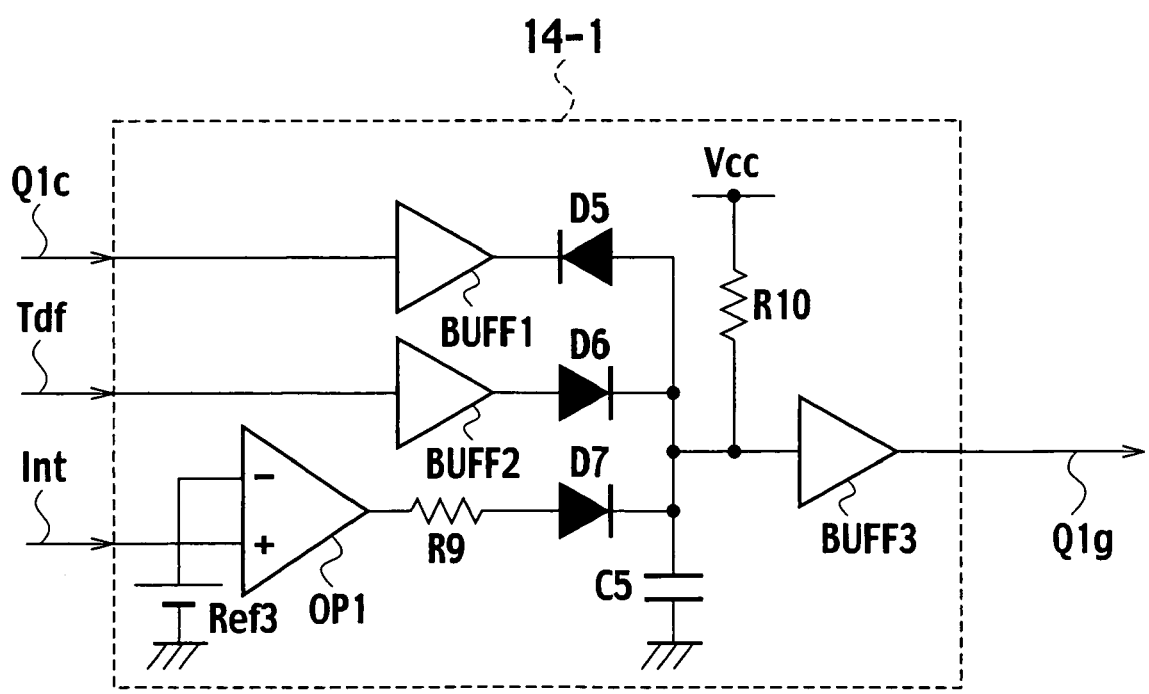
FIG. 18 is a circuit diagram showing an example 1 of a first delay circuit in the DC converter of the first embodiment shown in FIG. 4.

FIG. 18 is a circuit diagram showing an example 1 of the first delay circuit 14 arranged in the DC converter of the first embodiment shown in FIG. 4. In the first delay circuit 14-1 of FIG. 18, an error amplifier OP1 has an inverting input terminal (−) connected to a reference power source Ref3, a non-inverting input terminal (+) connected to the integrated output Int, and an output terminal connected through a resistor R9 to the anode of a diode D7. The cathode of diode D7 is connected to a first end of a resistor R10 and a first end of a capacitor C5. A second end of the resistor R10 is connected to the power source Vcc. A second end of the capacitor C5 is grounded. The output Q1c of the controller 11 is connected through a buffer BUFF1 to the cathode of a diode D5. The anode of the diode D5 is connected to the first end of the capacitor C5. The output Tdf of the time difference detector 13 is connected through a buffer BUFF2 to the anode of a diode D6. The cathode of the diode D6 is connected to the first end of the capacitor C5. A node between the resistor R10 and the capacitor C5 is connected through a buffer BUFF3 to the gate of the main switch Q1.

Figures 19A, 19B:
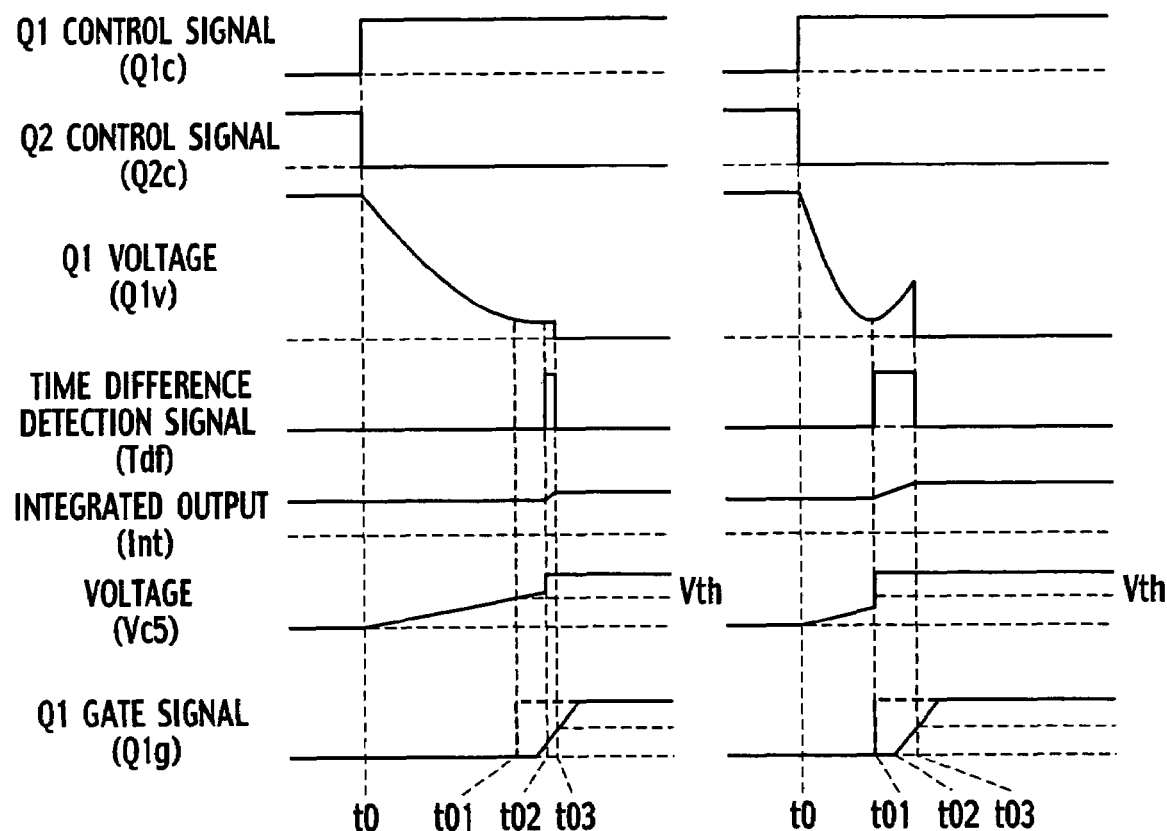
FIGS. 19A and 19B are timing charts showing signals related to the first delay circuit of FIG. 18 in a steady state and a transient state, respectively.

FIGS. 19A and 19B are timing charts showing signals related to the first delay circuit 14-1 shown in FIG. 18 in a steady state and a transient state, respectively.

Operation of the steady state of FIG. 19A will be explained. The error amplifier OP1 amplifies a voltage that is proportional to the integrated output Int of the integrator 20. At time t0, the Q1 control signal Q1c becomes high to increase the output of the buffer BUFF1 to high and charge the capacitor C5 with the output voltage of the error amplifier OP1 and resistor R9. At time t01, a voltage Vc5 of the capacitor C5 reaches a threshold Vth of the buffer BUFF3 to increase the output of the buffer BUFF3 to high. As a result, the main switch Q1 turns on at t03. Changes in the signals in a period from t01 to t03 are caused by the control delay and driver delay. The time difference detection signal Tdf of the time difference detector 13 indicates a time difference between t02 when the main switch Q1 provides a minimum voltage and t03 when the main switch Q1 turns on.

At time t02 when the time difference detector 13 detects the minimum voltage, the time difference detector 13 provides the buffer BUFF2 with a high level signal to increase the output of the buffer BUFF2 to high. The capacitor C5, therefore, is rapidly charged with the buffer BUFF2 and diode D6. At time t01, the Q1 gate signal Q1g (indicated with a dotted line) is already high, and therefore, is not affected.

The transient state of FIG. 19B in which pulse-by-pulse control takes place will be explained. In the transient state, the resonance frequency of the main switch Q1 suddenly changes from the steady state, as shown in FIG. 19B. When the resonance frequency of the main switch Q1 increases, the capacitor C5 is charged with the resistor R9 and diode D7 and starts to increase the voltage Vc5 at to. The voltage Vc5 of the capacitor C5 does not reach the threshold Vth of the buffer BUFF3 before t01.

At time t01, the time difference detector 13 detects a minimum voltage of the main switch Q1 and increases the time difference detection signal Tdf to high. This high level signal (corresponding to a pulse-by-pulse control signal) is applied through the buffer BUFF2 and diode D6 to the capacitor C5. As a result, the voltage Vc5 of the capacitor C5 instantaneously increases up to the threshold Vth of the buffer BUFF3, thereby turning on the main switch Q1 at t03.

Second Embodiment

Figure 20:
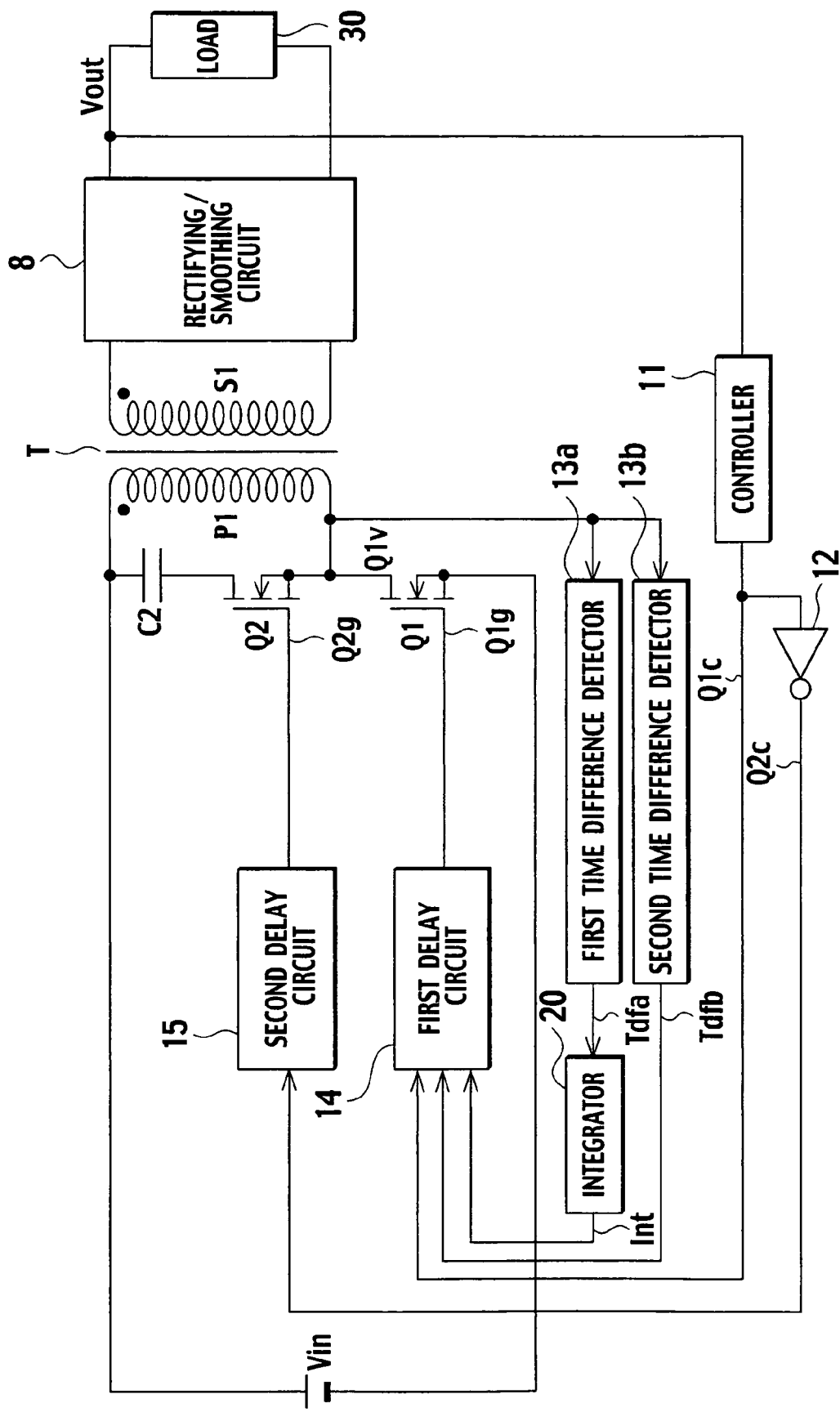
FIG. 20 is a circuit diagram showing a DC converter according to an second embodiment of the present invention.

FIG. 20 is a circuit diagram showing a DC converter according to the second embodiment of the present invention. This DC converter includes a first time difference detector 13a and a second time difference detector 13b whose minimum voltage detecting sensitivity is lower than that of the first time difference detector 13a.

The first time difference detector 13a detects a time difference between a point around which a main switch Q1 provides a minimum voltage (bottom level) after an auxiliary switch Q2 turns off and a point when the main switch Q1 turns on, and provides a time difference detection signal Tdfa to an integrator 20. The second time difference detector 13b detects a time difference between a point around which the main switch Q1 provides a minimum voltage after the auxiliary switch Q2 turns off and a point when the main switch Q1 turns on, and provides a time difference detection signal Tdfb as a pulse-by-pulse control signal to a first delay circuit 14.

The integrator 20 integrates the time difference detection signal Tdfa from the first time difference detector 13a and provides an integrated output Int to the first delay circuit 14. The first delay circuit 14 uses the output of the integrator 20 and the output of the second time difference detector 13b, to control a turn-on point of the main switch Q1. The first delay circuit 14 uses the output of the integrator 20 to reduce the output of the first time difference detector 13a. Also, the first delay circuit 14 uses the output of the second time difference detector 13b, to control a turn-on point of the main switch Q1 in a pulse-by-pulse manner.

Operations of the DC converter of the second embodiment in a steady state and transient state are substantially the same as those of the DC converter of the first embodiment shown in FIG. 4. The second embodiment separately includes the second time difference detector 13b whose minimum voltage detecting sensitivity is lower than that of the first time difference detector 13a, so that the pulse-by-pulse control may not erroneously work even when a minimum voltage of the main switch Q1 sharply varies in a slow transition state from a steady state.

A sharp change in a minimum voltage of the main switch Q1 that occurs during a slow transition from a steady state will be explained with reference to timing charts of FIGS. 21A to 21C.

If an input voltage or a load current slowly changes, the voltage Q1v of the main switch Q1 sequentially changes from a steady state 1 shown in FIG. 21A to a steady state 2 shown in FIG. 21B and to a steady state 3 shown in FIG. 21C. In a forward converter, for example, a decrease in an output current results in decreasing a current on the secondary side of a transformer of the forward converter to a cut-off level. If a point at which a current passing through a choke coil becomes zero agrees with a decreasing period of the voltage Q1v of a main switch Q1, the resonant state of a primary side of the transformer changes as shown in FIGS. 21A to 21C.

In FIG. 21C, a point when the main switch Q1 provides a minimum voltage suddenly changes from t03 to t0. In this case, pulse-by-pulse control may take place at to or may not take place occasionally, thereby destabilizing the operation of the DC converter.

To avoid this, the second embodiment employs the second time difference detector 13b whose minimum voltage detecting sensitivity is lower than that of the first time difference detector 13a. With the second time difference detector 13b, the second embodiment carries out no pulse-by-pulse control at t0 when a minimum voltage point suddenly changes in a slowly changing steady state. In this case, the second embodiment carries out pulse-by-pulse control at t03, to secure stable operation.

Figure 22:
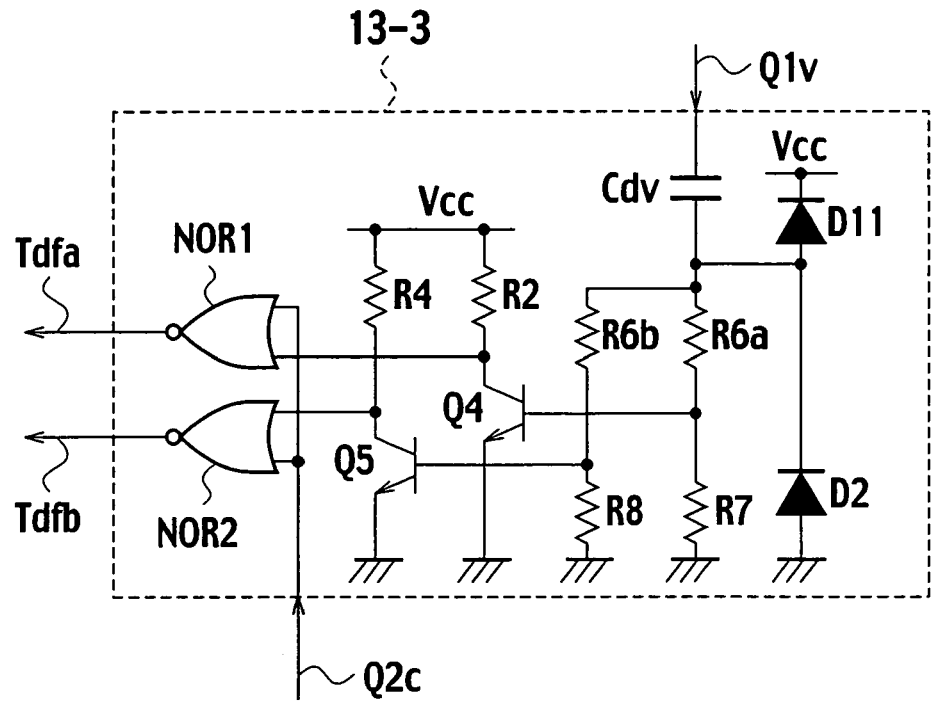
FIG. 22 is a circuit diagram showing an example 3 of a time difference detector in the DC converter of the second embodiment shown in FIG. 20.
Figure 23:
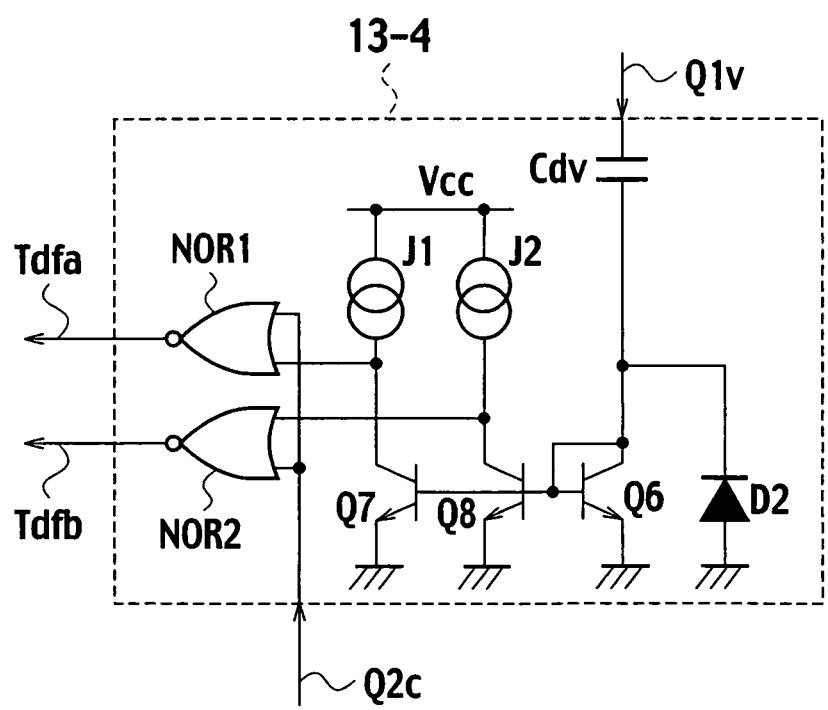
FIG. 23 is a circuit diagram showing an example 4 of the time difference detector in the DC converter of the second embodiment shown in FIG. 20.

The first and second time difference detectors 13a and 13b may be realized as a circuit 13-3 of FIG. 22 or a circuit 13-4 of FIG. 23 each employing a single capacitor Cdv shared by the detectors 13a and 13b.

In the circuit 13-3 shown in FIG. 22, the first time difference detector 13a includes a resistor R6a, a resistor R7, a transistor Q4, a resistor R2, and a NOR gate NOR1, and the second time difference detector 13b includes a resistor R6b, a resistor R8, a transistor Q5, a resistor R4, and a NOR gate NOR2. The capacitor Cdv, a diode D2, and a diode D11 are shared by the first and second time difference detectors 13a and 13b.

The first and second time difference detectors 13a and 13b each have the same structure as the time difference detector 13-1 of FIG. 10. What is different from FIG. 10 is that a node between the resistors R6a and R7 is connected to the base of the transistor Q4 and a node between the resistors R6b and R8 is connected to the base of the transistor Q5. The resistors R6a and R6b may have the same resistance value and the resistor R8 may have a smaller resistance value than the resistor R7, to decrease a threshold voltage. Then, the NOR gate NOR2 may have a lower minimum voltage detecting sensitivity than the NOR gate NOR1.

In the circuit 13-4 of FIG. 23, the first time difference detector 13a includes a constant current source J1, a transistor Q7, and a NOR gate NOR1, and the second time difference detector 13b includes a constant current source J2, a transistor Q8, and a NOR gate NOR2. The capacitor Cdv, a diode D2, and a transistor Q6 are shared by the first and second time difference detectors 13a and 13b.

The constant current source J1 may provide a smaller constant current than the constant current source J2, so that the NOR gate NOR2 may have a lower minimum voltage detecting sensitivity than the NOR gate NOR1.

The capacitor Cdv may be realized by connecting a diode in a reverse bias state and by using a capacitive element such as a junction capacitance of the reverse bias state.

Third Embodiment

Figure 24:
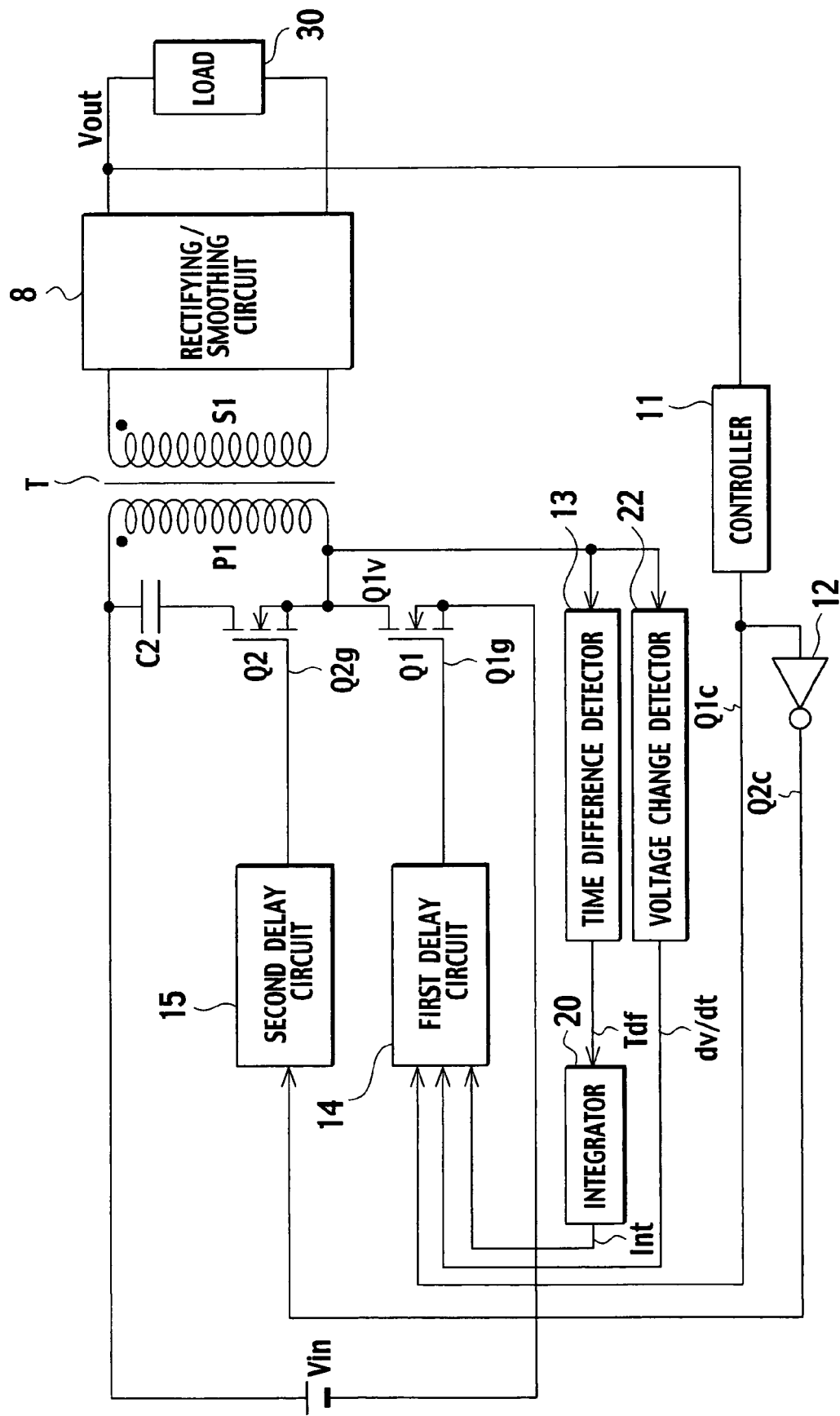
FIG. 24 is a circuit diagram showing a DC converter according to an third embodiment of the present invention.

FIG. 24 is a circuit diagram showing a DC converter according to the third embodiment of the present invention. The DC converter of the third embodiment includes a time difference detector 13 and a voltage change detector 22. Namely, the third embodiment employs the voltage change detector 22 instead of the second time difference detector 13b of FIG. 20.

The voltage change detector 22 detects a temporal change dV/dt in a voltage Q1v of a main switch Q1 and supplies a pulse-by-pulse control signal representative of the temporal change in the voltage Q1v to a first delay circuit 14. The first delay circuit 14 uses the output of an integrator 20 and the output of the voltage change detector 22 to delay a turn-on point of the main switch Q1. The first delay circuit 14 uses the output of the integrator 20 to minimize the output of the time difference detector 13. Based on the pulse-by-pulse control signal from the voltage change detector 22, the first delay circuit 14 controls a turn-on point of the main switch Q1.

Except the voltage change detector 22 that replaces the second time difference detector 13b of the DC converter of FIG. 20, the DC converter of FIG. 24 is basically the same as the DC converter of FIG. 20. Accordingly, an explanation of operation of the DC converter of the third embodiment is omitted.

The time difference detector 13 and voltage change detector 22 may share a single capacitor Cdv like the time difference detector 13-3 of FIG. 22 or the time difference detector 13-4 of FIG. 23. The capacitor Cdv may be realized by connecting a diode in a reverse bias state and by using a capacitive element such as a junction capacitance of the reverse bias state.

Fourth Embodiment

Figure 25:
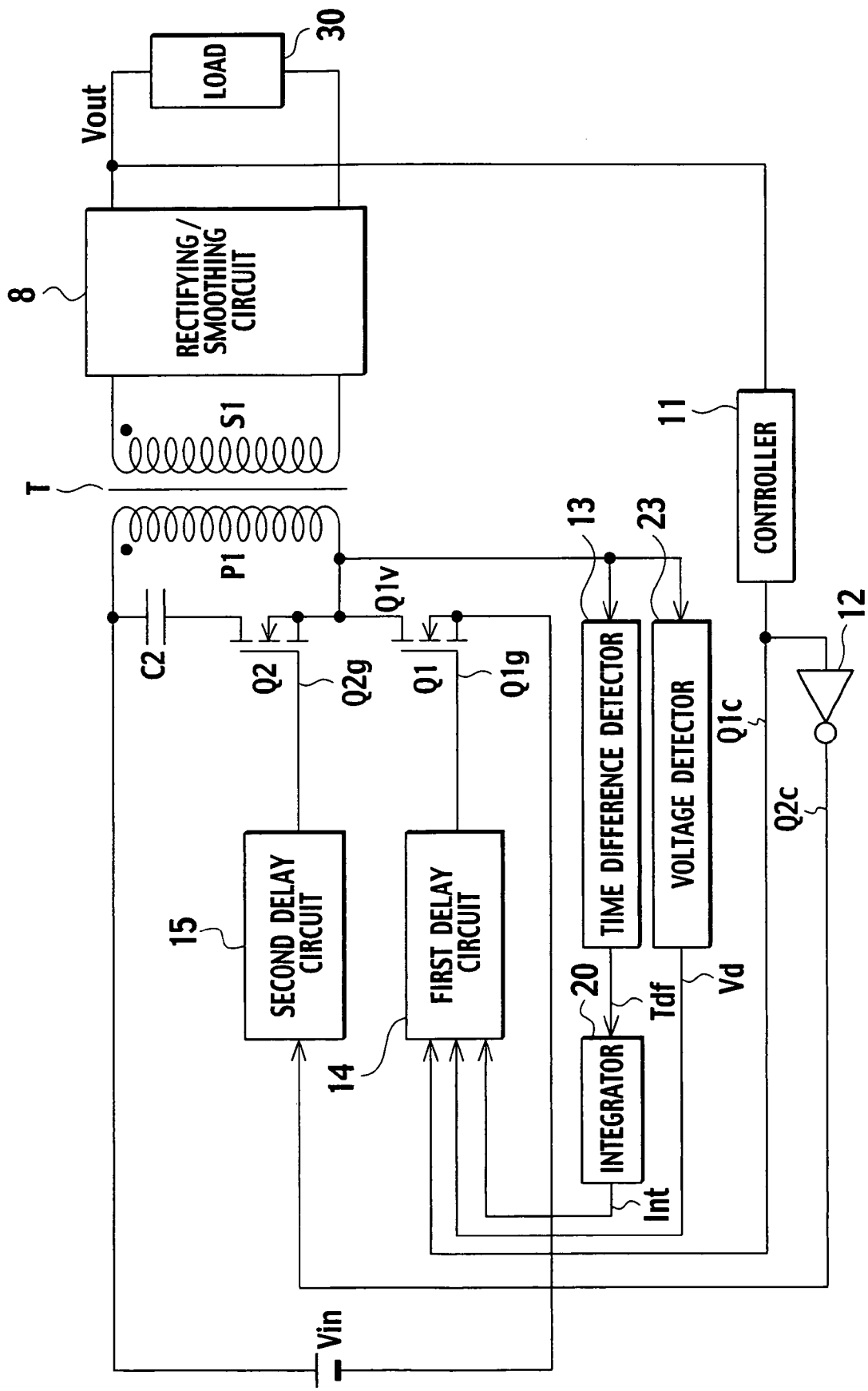
FIG. 25 is a circuit diagram showing a DC converter according to an fourth embodiment of the present invention.

FIG. 25 is a circuit diagram showing a DC converter according to the fourth embodiment of the present invention. The DC converter of the fourth embodiment includes a time difference detector 13 and a voltage detector 23. Namely, the fourth embodiment employs the voltage detector 23 instead of the second time difference detector 13b of FIG. 20.

The voltage detector 23 detects a voltage Q1v of a main switch Q1. A first delay circuit 14 uses the output of an integrator 20 and the output of the voltage detector 23 to delay a turn-on point of the main switch Q1. The first delay circuit 14 uses the output of the integrator 20 to lessen the output of the time difference detector 13. With the use of a pulse-by-pulse control signal based on the output of the voltage detector 23, the first delay circuit 14 controls a turn-on point of the main switch Q1 in a pulse-by-pulse manner.

Except the voltage detector 23 that replaces the second time difference detector 13b of the DC converter of FIG. 20, the DC converter of FIG. 25 is basically the same as the DC converter of FIG. 20. Accordingly, an explanation of operation of the DC converter of the fourth embodiment is omitted.

Figure 26:
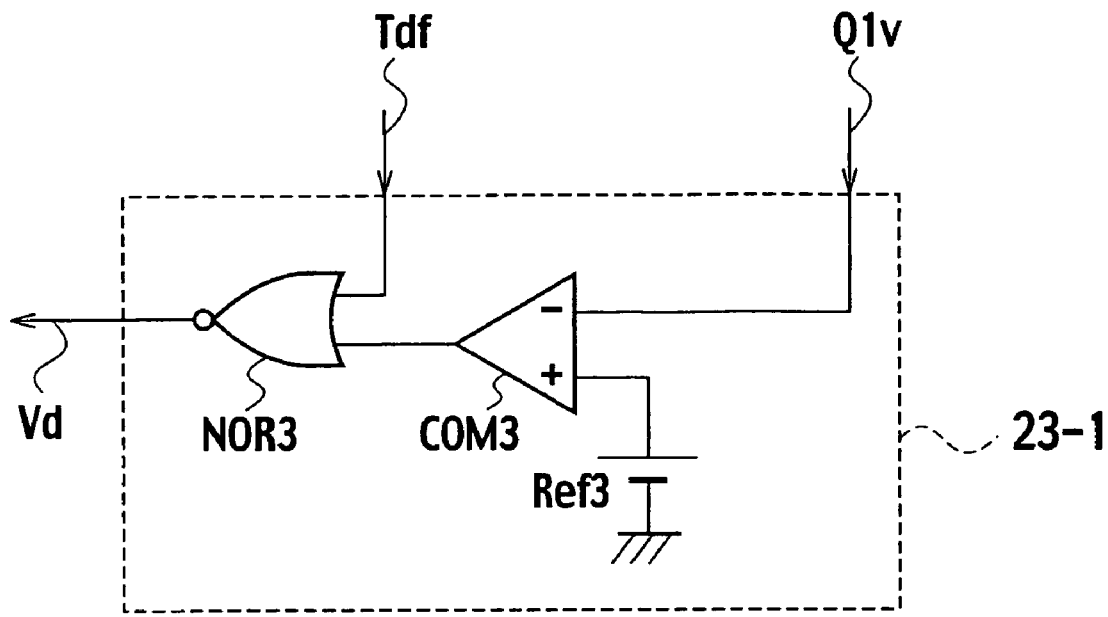
FIG. 26 is a circuit diagram showing an example 1 of a voltage detector in the DC converter of the fourth embodiment shown in FIG. 25.

FIG. 26 is a circuit diagram showing an example 1 of the voltage detector 23 arranged in the DC converter of the fourth embodiment shown in FIG. 25. The voltage detector 23-1 includes a comparator COM3 having an inverting input terminal (−) to receive the voltage Q1v of the main switch Q1 and a non-inverting input terminal (+) to receive a voltage from a reference power source Ref3. The voltage detector 23-1 also includes a NOR gate NOR3 that operates a NOR of the output of the comparator COM3 and a time difference detection signal Tdf from the time difference detector 13 and provides an output Vd as a pulse-by-pulse signal to the first delay circuit 14.

The voltage detector 23-1 of FIG. 26 uses the output Tdf of the time difference detector 13 to provide the first delay circuit 14 with a pulse-by-pulse control signal when the voltage Q1v of the main switch Q1 reaches a minimum voltage (bottom level) and then a voltage set by the reference power source Ref3. Consequently, the first delay circuit 14 can control a turn-on point of the main switch Q1 in a pulse-by-pulse manner.

Figure 27:
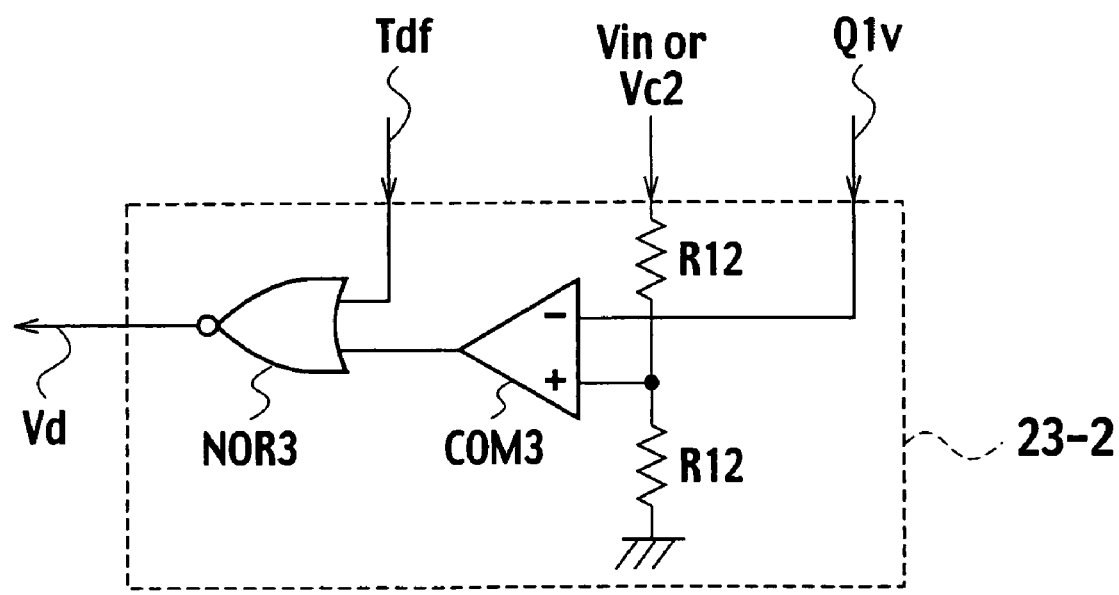
FIG. 27 is a circuit diagram showing an example 2 of the voltage detector in the DC converter of the fourth embodiment shown in FIG. 25.

FIG. 27 is a circuit diagram showing an example 2 of the voltage detector 23 arranged in the DC converter of the fourth embodiment shown in FIG. 25. The voltage detector 23-2 includes a comparator COM3 having an inverting input terminal (−) to receive the voltage Q1v of the main switch Q1 and a non-inverting input terminal (+) to receive a voltage of a DC power source Vin or a voltage Vc2 of a clamp capacitor C2 either divided by resistors R12 and R13. The voltage detector 23-2 further includes a NOR gate NOR3 to operate a NOR of the output of the comparator COM3 and the time difference detection signal Tdf from the time difference detector 13 and provide the first delay circuit 14 with a NOR output Vd as a pulse-by-pulse control signal.

The example 2 of FIG. 27 employs, instead of the voltage of the reference power source Ref3 of FIG. 26, a voltage proportional to the voltage of the DC power source Vin or the voltage Vc2 of the clamp capacitor C2. Operation of the example 2 of FIG. 27 is basically the same as that of the example 1 of FIG. 26.

Fifth Embodiment

Figure 28:
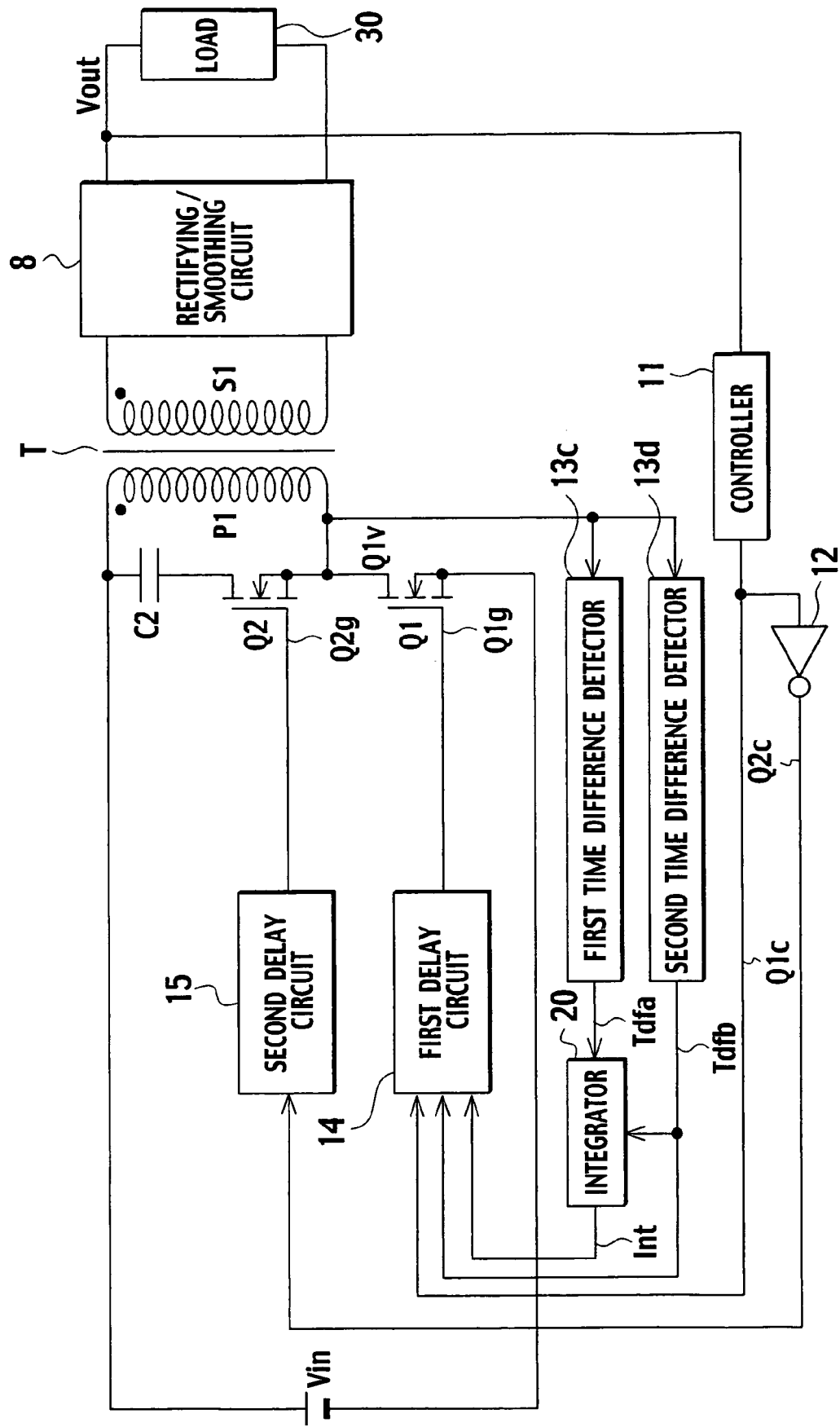
FIG. 28 is a circuit diagram showing a DC converter according to an fifth embodiment of the present invention.

FIG. 28 is a circuit diagram showing a DC converter according to the fifth embodiment of the present invention. The DC converter of the fifth embodiment employs a first time difference detector 13c and a second time difference detector 13d.

The first time difference detector 13c detects a time difference between a point around which a main switch Q1 provides a minimum voltage after an auxiliary switch Q2 turns off and a point at which the main switch Q1 turns on, and provides a time difference detection signal Tdfa to an integrator 20. The second time difference detector 13d detects a time difference between a point around which the main switch Q1 provides a minimum voltage after the auxiliary switch Q2 turns off and a point at which the main switch Q1 turns on, and provides a time difference detection signal Tdfb as a pulse-by-pulse control signal to a first delay circuit 14 and the integrator 20.

When the second time difference detector 13d provides a pulse-by-pulse control signal to carry out pulse-by-pulse control, the integrator 20 integrates the output of the first time difference detector 13c and the output of the second time difference detector 13d and outputs an integrated output Int to the first delay circuit 14. The first delay circuit 14 uses the output of the integrator 20 and the output of the second time difference detector 13d to control a turn-on point of the main switch Q1. The first delay circuit 14 uses the output of the integrator 20 to minimize the output of the first time difference detector 13c. Also, the first delay circuit 14 uses the pulse-by-pulse control signal from the second time difference detector 13d to control a turn-on point of the main switch Q1.

Figure 29:
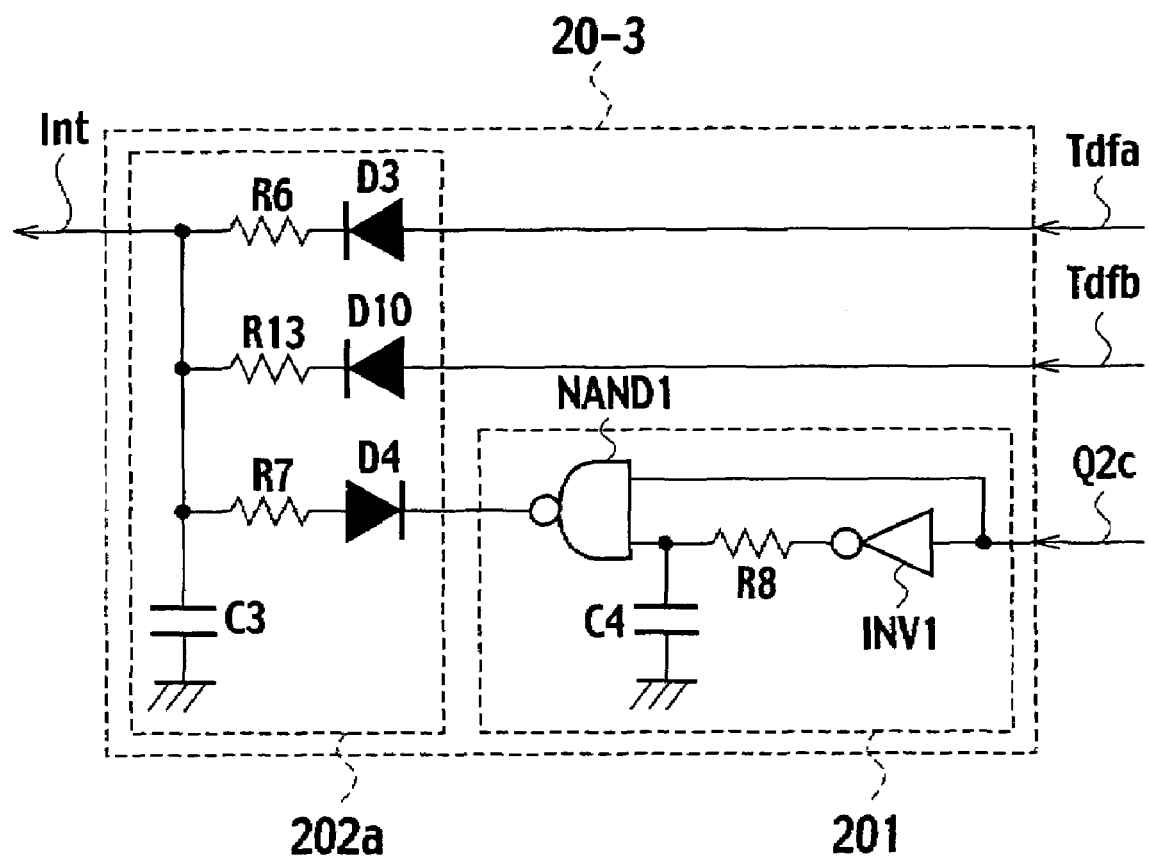
FIG. 29 is a circuit diagram showing an example 3 of an integrator in the DC converter of the fifth embodiment shown in FIG. 28.

FIG. 29 is a circuit diagram showing an example 3 of the integrator 20 arranged in the DC converter of the fifth embodiment shown in FIG. 28. When carrying out the pulse-by-pulse control, the integrator 20-3 of FIG. 29 adds the output of the second time difference detector 13d in addition to the output of the first time difference detector 13c.

Compared with the integrator 20-2 of FIG. 17, the integrator 20-3 of FIG. 29 additionally has a series circuit including a resistor R13 and a diode D10 between a first end of a capacitor C3 and the output of the second time difference detector 13d.

In the pulse-by-pulse control, the output of the second time difference detector 13d charges the capacitor C3 through the diode D10 and resistor R13. Namely, the capacitor C3 is additionally charged. Decreasing the resistance of the resistor R13 lower than that of a resistor R6 results in further charging the capacitor C3, to improve a transient response speed of the integrator 20-3.

When the resonance frequency of the main switch Q1 changes from the steady state 1 shown in FIG. 7A to the steady state 2 shown in FIG. 7C, the integrated output Int of the integrator 20-3 will change from the voltage level of the steady state 1 shown in FIG. 7A to the voltage level of the steady state 2 shown in FIG. 7C. In the transient state shown in FIG. 7B, the output of the integrator 20-3 increases according to the output Tdfa of the first time difference detector 13c.

A quick change in the output of the integrator 20-3 corresponds to a long transient responsivity of the integrator 20-3. Decreasing an integration time constant of the output Tdfa of the time difference detector 13c results in destabilizing operation in a steady state. To stabilize operation in a steady state, the integration time constant of the output Tdfa of the time difference detector 13c must be large.

To carry out the pulse-by-pulse control, the fifth embodiment additionally charges the capacitor C3 through the resistor R13 and diode D10 of the integrator 20-3 according to the output Tdfb (pulse-by-pulse control signal) from the second time difference detector 13d. Namely, the voltage of the integrator 20-3 can rapidly increase in the transient state of FIG. 7B, to improve a transient responsivity. Improving the transient responsivity results in reducing the integration time constant of the output Tdfa of the first time difference detector 13c, to stabilize operation in a steady state.

Sixth Embodiment

Figure 30:
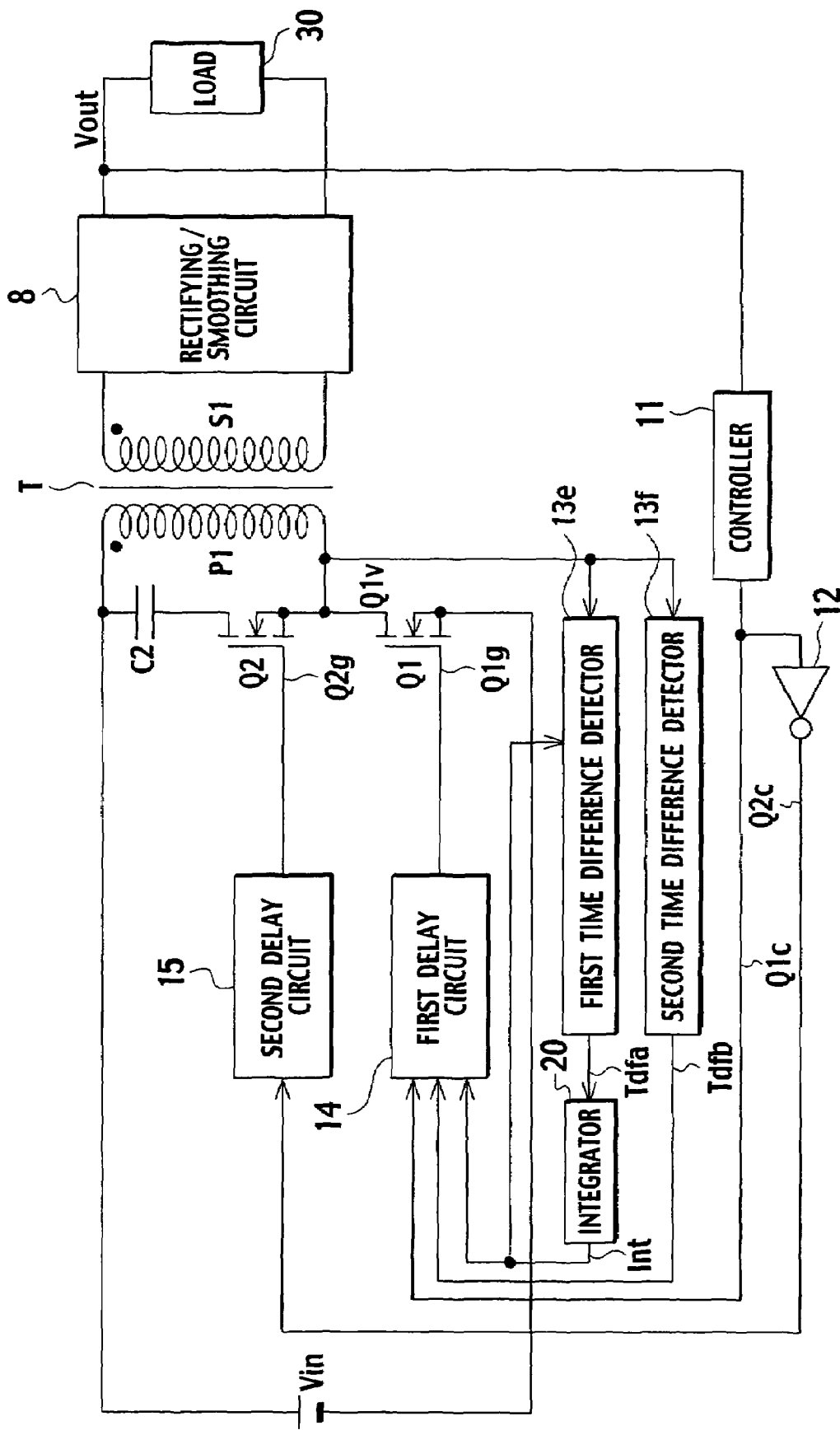
FIG. 30 is a circuit diagram showing a DC converter according to an sixth embodiment of the present invention.

FIG. 30 is a circuit diagram showing a DC converter according to the sixth embodiment of the present invention. The DC converter of the sixth embodiment includes a first time difference detector 13e and a second time difference detector 13f.

The second time difference detector 13f detects a time difference between a point around which a main switch Q1 provides a minimum voltage after an auxiliary switch Q2 turns off and a point at which the main switch Q1 turns on, and provides a second time difference detection signal Tdfb as a pulse-by-pulse control signal to a first delay circuit 14.

The first delay circuit 14 uses the output of an integrator 20 and the output of the second time difference detector 13f to control a turn-on point of the main switch Q1. The first delay circuit 14 uses the output of the integrator 20 to minimize the output of the first time difference detector 13e. Also, the first delay circuit 14 uses the output of the second time difference detector 13f to control a turn-on point of the main switch Q1 in a pulse-by-pulse manner.

Based on the integrated output Int of the integrator 20, the first time difference detector 13e detects a time difference between a point around which the main switch Q1 provides a minimum voltage after the auxiliary switch Q2 turns off and a point at which the main switch Q1 turns on, and provides a first time difference detection signal Tdfa to the integrator 20. Namely, the first time difference detector 13e adjusts sensitivity for detecting a point at which the main switch Q1 reaches a minimum voltage according to a resonance frequency of the main switch Q1. As a result, the first time difference detector 13e can always detect a point around which the main switch Q1 provides a minimum voltage even if the resonance frequency of the main switch Q1 is so high that a time after the auxiliary switch Q2 turns off until the main switch Q1 reaches a minimum voltage is too short, or even if the resonance frequency of the main switch Q1 is so low that a time after the auxiliary switch Q2 turns off until the main switch Q1 reaches a minimum voltage is too long.

When the output Tdfa of the first time difference detector 13e becomes high, a voltage change dV/dt of the main switch Q1 is expressed as follows:

$$dV/dt = Vbe/(R2 \cdot Cdv).$$

This expression is based on the time difference detector shown in FIG. 10. The value Vbe is a base-emitter voltage of the transistor Q3 connected to the first end of the capacitor Cdv shown in FIG. 10. The value R2 is the resistor connected between the base of the transistor Q3 and the ground.

If the resonance frequency of the main switch Q1 is low, the voltage change dV/dt of the main switch Q1 is small. In this case, the resistor R2 must be increased to detect a minimum voltage of the main switch Q1 at a point when a current passing to the capacitor Cdv is small. On the other hand, if the resonance frequency of the main switch Q1 is high, the resistor R2 must be decreased to stably detect a minimum voltage of the main switch Q1 at a point when a current passing to the capacitor Cdv is large. To achieve this, the sixth embodiment changes the resistance of the resistor R2 according to the resonance frequency of the main switch Q1, thereby controlling a bias current to the transistor Q3.

Figure 31:
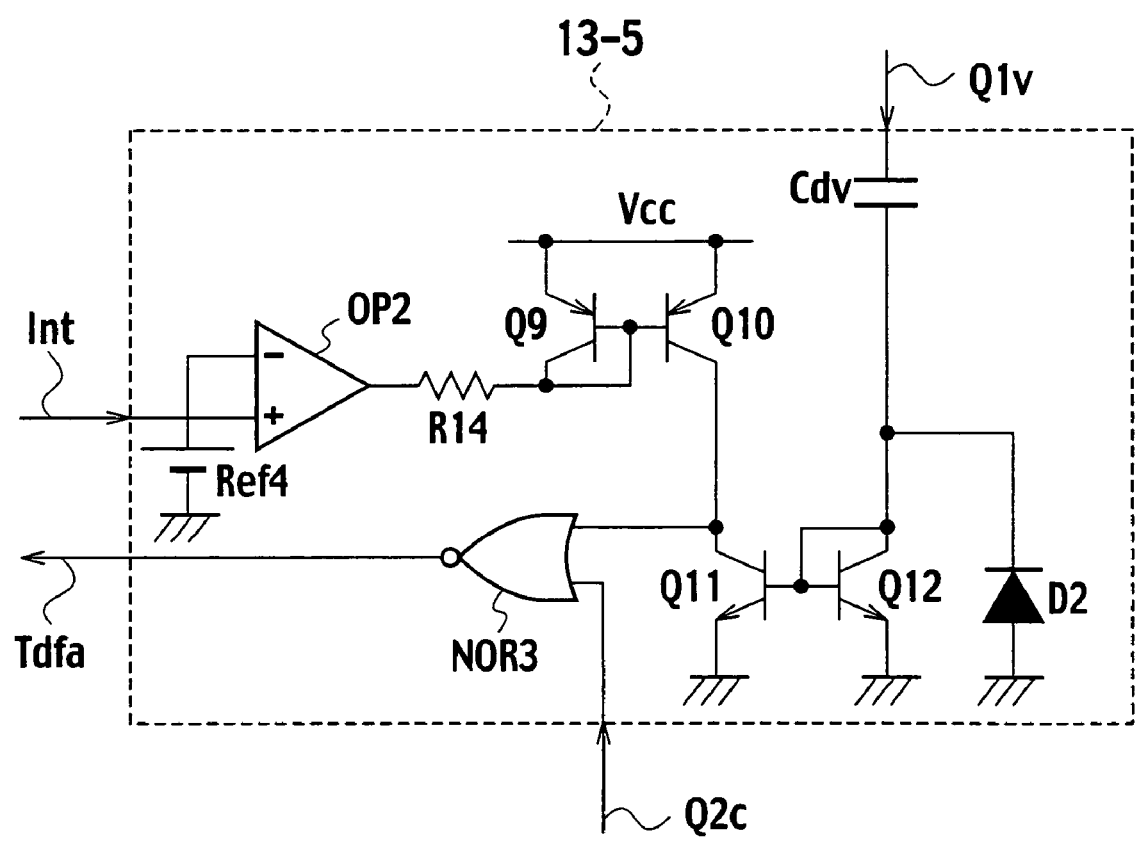
FIG. 31 is a circuit diagram showing an example 5 of a time difference detector in the DC converter of the sixth embodiment shown in FIG. 30.

FIG. 31 is a circuit diagram showing an example 5 of the first time difference detector 13e arranged in the DC converter of the sixth embodiment shown in FIG. 30. The time difference detector 13-5 shown in FIG. 31 controls a minimum voltage detecting sensitivity according to a resonance frequency.

In the time difference detector 13-5, transistors Q11 and Q12 form a current mirror circuit. The collector and base of the transistor Q12 are connected to a node between a capacitor Cdv and a diode D2. The emitters of the transistors Q11 and Q12 are grounded. Transistors Q9 and Q10 form a current source. The emitters of the transistors Q9 and Q10 are connected to a power source Vcc. The collector of the transistor Q10 is connected to the collector of the transistor Q11 and a first end of a NOR gate NOR3. A second end of the NOR gate NOR3 receives a Q2 control signal Q2c, and an output of the NOR gate NOR3 provides the time difference detection signal Tdfa. An error amplifier OP2 has an inverting input terminal (−) connected to a reference power source Ref4 and a non-inverting input terminal (+) connected to the integrated output Int of the integrator 20. An output of the error amplifier OP2 is connected through a resistor R14 to the base and collector of the transistor Q9 and the base of the transistor Q10.

In the time difference detector 13-5, a current passing through the capacitor Cdv is compared with a current from the current source formed with the transistors Q9 and Q10 with the use of the current mirror circuit formed with the transistors Q11 and Q12. A current passing through the transistor Q9 is determined by the output voltage of the error amplifier OP2 and the resistance of the resistor R14. If the output Int of the integrator 20 is large and the resonance frequency of the main switch Q1 is high, the current of the transistor Q9 is large. On the other hand, if the output Int of the integrator 20 is small and the resonance frequency of the main switch Q1 is low, the current of the transistor Q9 is small. Accordingly, a point around which the main switch Q1 provides a minimum voltage is stably detectable even if the resonance frequency of the main switch Q1 varies. Namely, even if the resonance frequency of the main switch Q1 varies, the main switch Q1 can be stably turned on at a minimum voltage.

Seventh Embodiment

Figure 32:
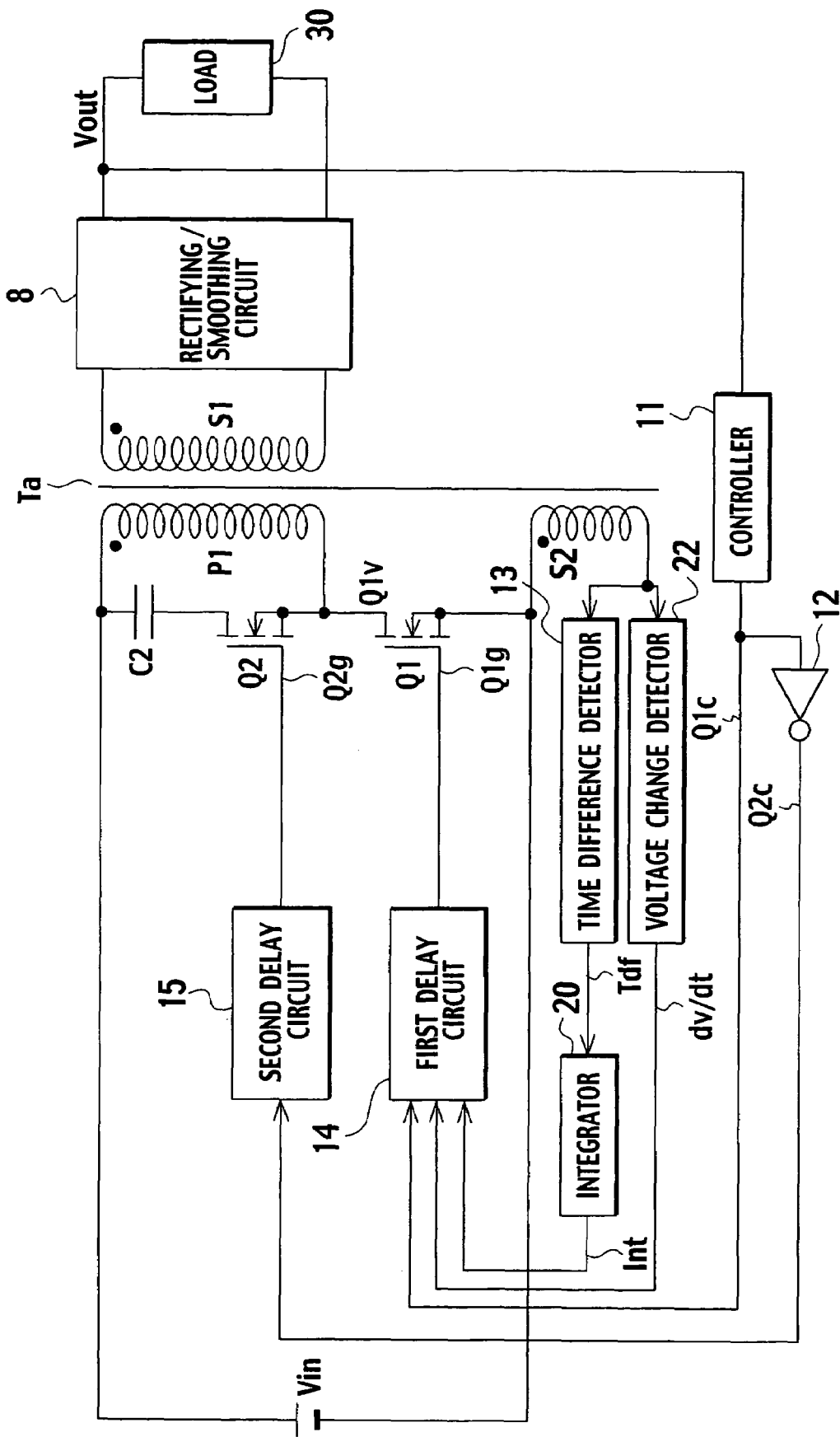
FIG. 32 is a circuit diagram showing a DC converter according to an seventh embodiment of the present invention.

FIG. 32 is a circuit diagram showing a DC converter according to the seventh embodiment of the present invention. The DC converter of the seventh embodiment includes a transformer Ta having a primary winding P1, a secondary winding S1 coupled with the primary winding P1, and a tertiary winding S2 coupled with the primary winding P1. A first end of the tertiary winding S2 is connected to the source of a main switch Q1 and the negative electrode of a DC power source Vin. A second end of the tertiary winding S2 is connected to an input terminal of a time difference detector 13 and an input terminal of a voltage change detector 22. The tertiary winding S2 may be an auxiliary winding that serves as a power source to control the power source voltage of a control IC.

In the DC converter of the seventh embodiment, a first end of the primary winding P1 of the transformer Ta is connected to the DC power source Vin, and the primary winding P1 generates a voltage proportional to a voltage of the main switch Q1. The number of turns of the tertiary winding S2 and the number of turns of the primary winding P1 have a ratio of S2:P1=1:NP. Then, the tertiary winding S2 generates a voltage of 1/NP of the voltage generated at the primary winding P1. As a result, the time difference detector 13 and voltage change detector 22 can be controlled with a low voltage proportional to the voltage of the main switch Q1. This means that the time difference detector 13 and voltage change detector 22 can be made of low-withstand-voltage parts.

Eighth Embodiment

Figure 33:
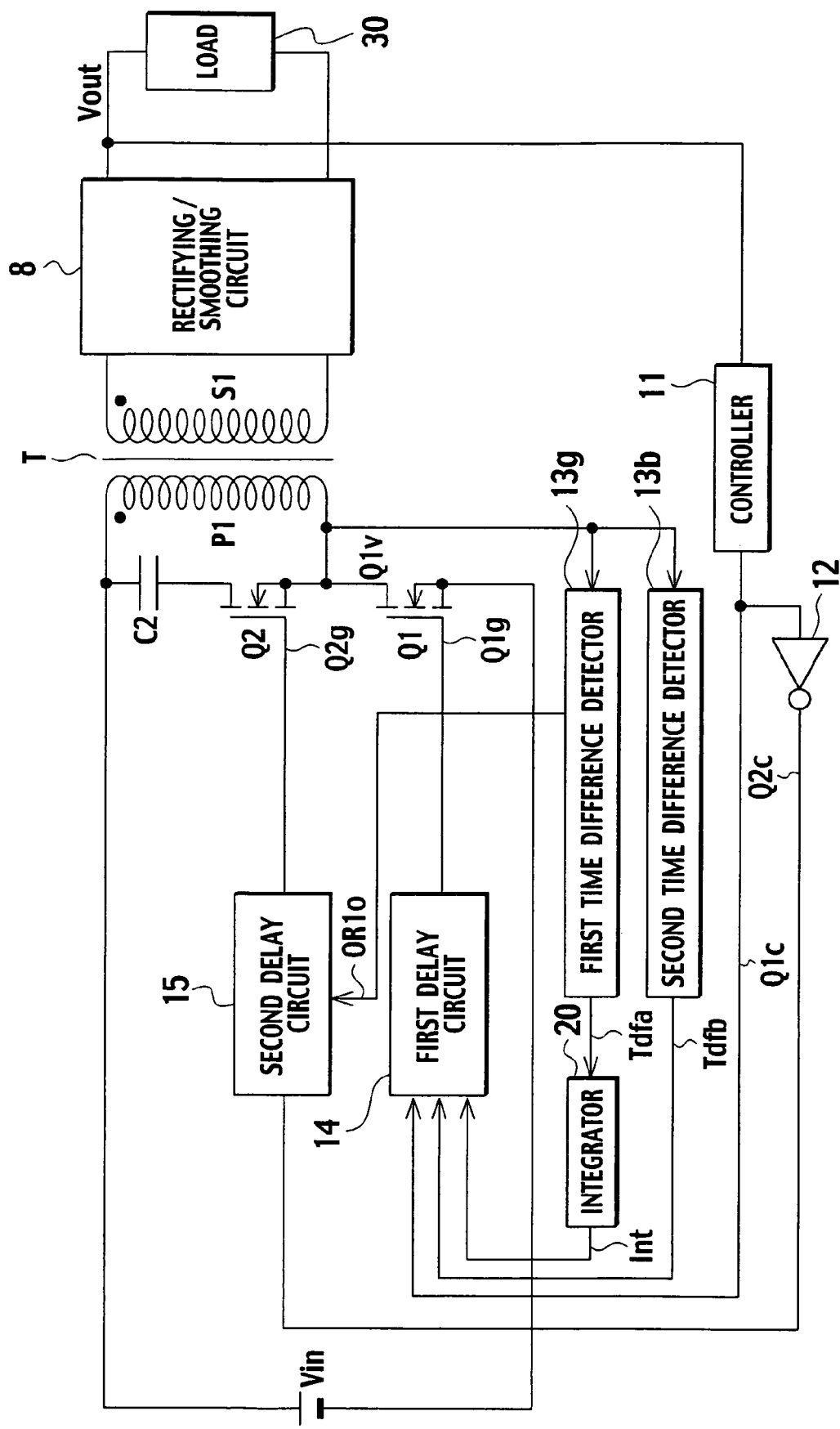
FIG. 33 is a circuit diagram showing a DC converter according to an eighth embodiment of the present invention.

FIG. 33 is a circuit diagram showing a DC converter according to the eighth embodiment of the present invention. The DC converter of the eighth embodiment includes a first time difference detector 13g and a second time difference detector 13b.

The first time difference detector 13g detects a time difference between a point around which a main switch Q1 provides a minimum voltage after an auxiliary switch Q2 turns off and a point at which the main switch Q1 turns on, and provides a first time difference detection signal Tdfa to an integrator 20 and a second delay circuit 15.

The second time difference detector 13b detects a time difference between a point around which the main switch Q1 provides a minimum voltage after the auxiliary switch Q2 turns off and a point at which the main switch Q1 turns on, and provides a second time difference detection signal Tdfb as a pulse-by-pulse control signal to a first delay circuit 14.

After the main switch Q1 turns off, the second delay circuit 15 uses a Q2 control signal Q2c for the auxiliary switch Q2 from an inverter 12 and the time difference detection signal from the first time difference detector 13g, to generate a delayed Q2 gate signal Q2g, which is applied to the gate of the auxiliary switch Q2 to drive the auxiliary switch Q2.

Figure 34:
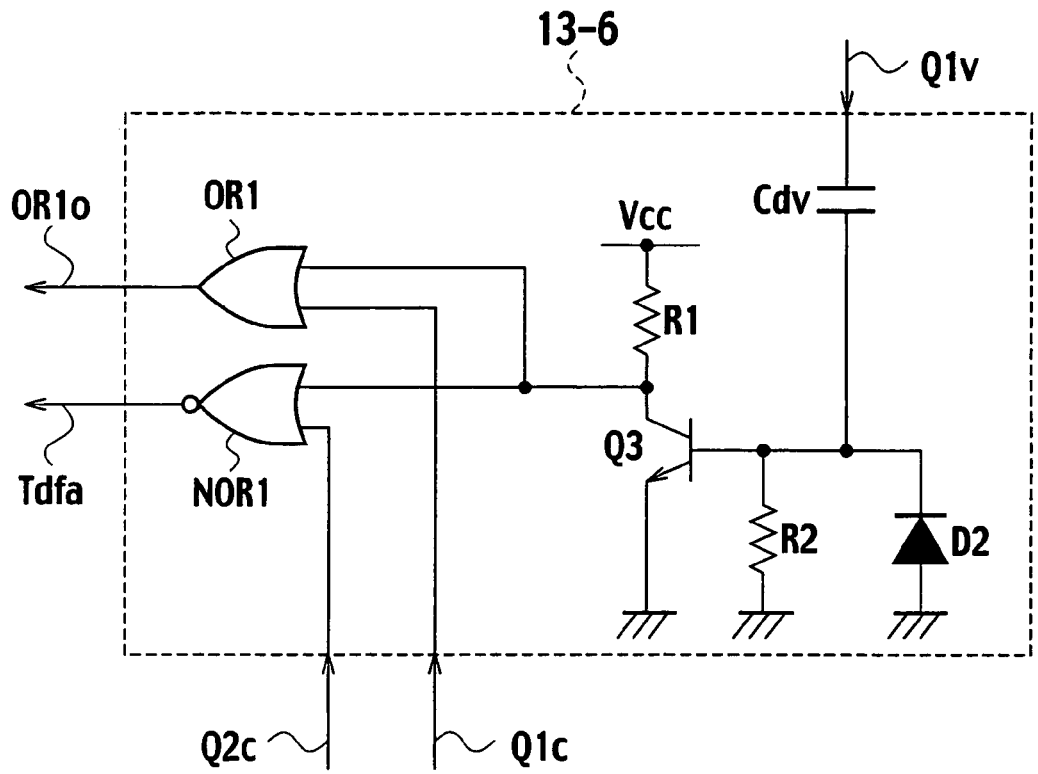
FIG. 34 is a circuit diagram showing an example 6 of a time difference detector in the DC converter of the eighth embodiment shown in FIG. 33.

FIG. 34 is a circuit diagram showing an example 6 of the first time difference detector 13g of the eighth embodiment shown in FIG. 33. The time difference detector 13-6 of FIG. 34 has, in addition to the elements of the time difference detector 13-1 of FIG. 10, an OR gate OR1 operating OR logic of the Q1 control signal Q1c and a signal from the collector of a transistor Q3 and providing an output OR1o to the second delay circuit 15.

Figure 35:
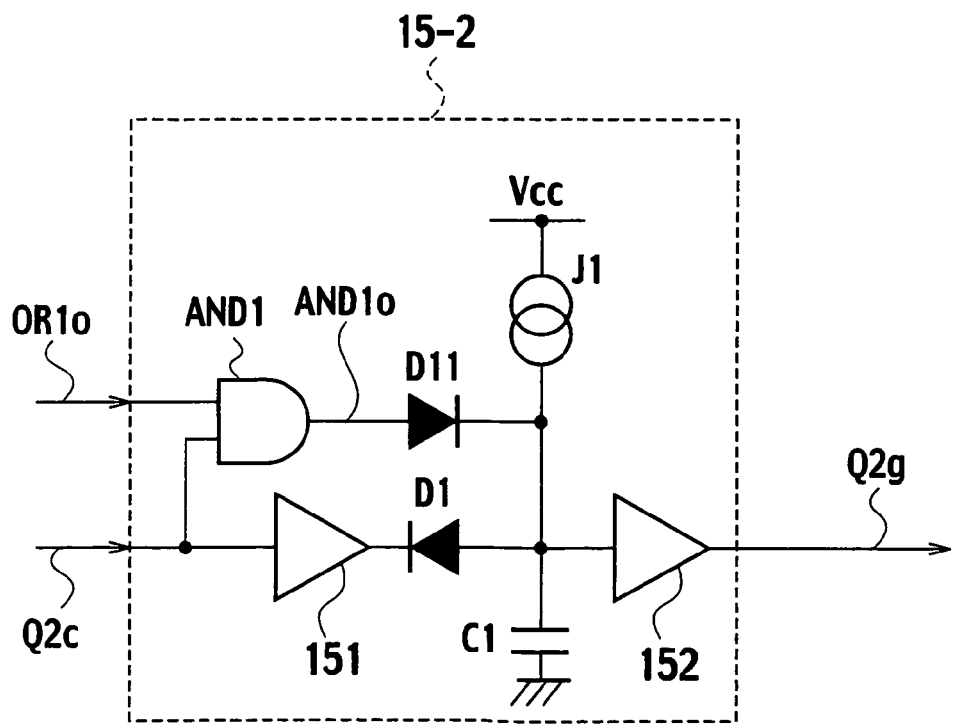
FIG. 35 is a circuit diagram showing an example 2 of a second delay circuit in the DC converter of the eighth embodiment shown in FIG. 33.

FIG. 35 is a circuit diagram showing an example 2 of the second delay circuit 15 arranged in the DC converter of the eighth embodiment shown in FIG. 33. The second delay circuit 15-2 of FIG. 35 has, in addition to the elements of the second delay circuit 15-1 of FIG. 8, an AND gate AND1 operating AND logic of the Q2 control signal Q2c and the output OR1o from the OR gate OR1, and a diode D11 having an anode connected to the output of the AND gate AND1 and a cathode connected to a current source J1 and a first end of a capacitor C1.

Figure 36:
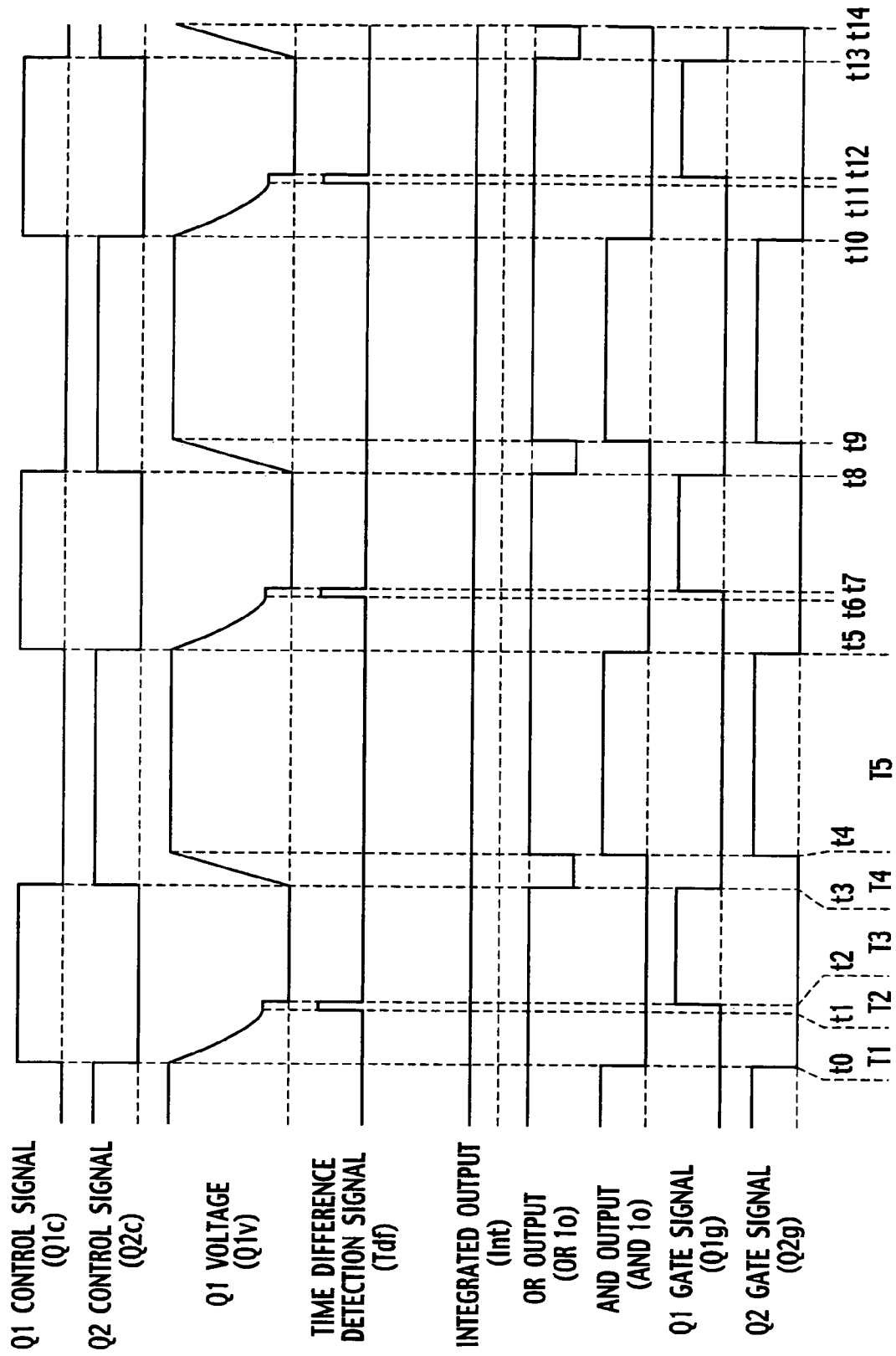
FIG. 36 is a timing chart showing signals at various parts of the DC converter of the eighth embodiment in a steady state.

FIG. 36 is a timing chart showing signals at various parts of the DC converter of the eighth embodiment in a steady state.

In the time difference detector 13-6, the transistor Q3 turns on when the voltage Q1v of the main switch Q1 increases after the main switch Q1 turns off. The time difference detector 13-6 detects a time difference between a point at which the main switch Q1 provides a minimum voltage after the auxiliary switch Q2 turns off and a point at which the main switch Q1 turns on. To detect the time difference, a NOR gate NOR1 of the time difference detector 13-6 operates a NOR of a signal from the transistor Q3 and the Q2 control signal Q2c.

The OR logic operation of the signal from the transistor Q3 and the Q1 control signal Q1c executed by the OR gate OR1 of FIG. 34 provides the output OR1o as shown in FIG. 36. The output OR1o is supplied to the AND gate AND1 of the second delay circuit 15-2 as shown in FIG. 36. Namely, a delay time of the auxiliary switch Q2 can easily be controlled according to the output of the AND gate AND1, to thereby realize the zero-volt switching of the auxiliary switch Q2.

As mentioned above, the DC converter according to the present invention employs the time difference detector 13 to detect a time difference between a point at which the main switch Q1 provides a minimum voltage (bottom level) and a point at which the main switch Q1 turns on and generate a finite pulse. The integrator 20 averages the output of the time difference detector 13. Based on the output of the integrator 20, the delay control unit (14) delays a Q1 control signal for driving the main switch Q1 in such a way as to delete an unnecessary part of the pulse from the time difference detector 13. This configuration can correct a bottom detection error or a detection point variation due to disturbance, compensate for a control delay and a switching delay, and stably and surely turn on the main switch Q1 around a point at which the main switch Q1 provides a minimum voltage.

In a transient state at the start of operation or when load varies, a time between a point when the auxiliary switch Q2 turns off and a point when the main switch Q1 provides a minimum voltage varies. In this case, the present invention carries out pulse-by-pulse control to turn on the main switch Q1 around a point at which the main switch Q1 provides a bottom voltage. Accordingly, the DC converter of the present invention can reduce a switching loss and switching noise and improve efficiency in every state from a steady state to a transient state.

The present invention is not limited to the above-mentioned embodiments. Any combination of the first to eighth embodiments falls in the scope of the present invention. The same control on the main switch Q1 in the embodiments 1 to 8 is also achievable on the auxiliary switch Q2.

In this way, the DC converter according to the present invention employs a time difference detector to detect a time difference between a point around which the voltage of a main switch reaches a minimum and a point at which the main switch turns on and generate a finite pulse. The output of the time difference detector is averaged by the integrator. Based on the output of the integrator, a delay control unit delays a control signal for driving the main switch in such a way as to delete an unnecessary part in the output of the time difference detector. This configuration can correct a bottom level detection error or a detection point variation due to disturbance, compensate for a control delay and a switching delay, and stably and surely turn on the main switch around a point at which the main switch provides a minimum voltage.

In a transient state at the start of operation or when load varies, a time between a point when an auxiliary switch turns off and a point when the main switch provides a minimum voltage varies. In this case, the DC converter according to the present invention carries out pulse-by-pulse control to turn on the main switch around a point at which the main switch provides a bottom level. The DC converter of the present invention, therefore, can reduce a switching loss and switching noise and improve efficiency in every state from a steady state to a transient state.

The present invention is applicable to DC-DC converting power sources and AC-DC converting power sources.

This application claims benefit of priority under 35USC §119 to Japanese Patent Applications No. 2005-073668, filed on Mar. 15, 2005, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A DC converter having a transformer, a main switch connected in series with a primary winding of the transformer, and a series circuit being connected to ends of one of the primary winding and main switch and including a clamp capacitor and an auxiliary switch, the main and auxiliary switches being alternately turned on/off so that a secondary winding of the transformer generates a voltage that is rectified and smoothed with a rectifying/smoothing circuit to provide a DC output, the DC converter comprising:
a time difference detector configured to detect a time difference between a point around which the main switch provides a minimum level after the auxiliary switch turns off and a point at which the main switch turns on;
an integrator configured to integrate the output of the time difference detector; and
a delay controller configured to control a turn-on point of the main switch according to the outputs of the integrator and time difference detector,
the delay controller operating to minimize the output of the time difference detector according to the output of the integrator and controlling a turn-on point of the main switch in a pulse-by-pulse manner according to a pulse-by-pulse control signal based on the output of the time difference detector.

2. The DC converter of claim 1, wherein the time difference detector comprises:
a second voltage change detector configured to detect a temporal change in the voltage of the main switch; and
an ON detector configured to detect when the main switch turns on.

3. The DC converter of claim 1, wherein the integrator comprises
an integration element configured to add thereto the pulse-by-pulse control signal.

4. The DC converter of claim 1, wherein
the time difference detector controls a minimum level detecting sensitivity according to the output of the integrator and a voltage resonance frequency of the main switch.

5. The DC converter of claim 1, further comprising:
a first operation unit configured to add or subtract the output of the integrator; and
a second operation unit configured to subtract a predetermined value from an adding output from the first operation unit or adding the predetermined value to a subtracting output from the first operation unit at intervals of an on/off period of the main switch.

6. The DC converter of claim 1, wherein
the delay control unit controls a turn-on point of the auxiliary switch in a pulse-by-pulse manner according to the pulse-by-pulse control signal.

7. The DC converter of claim 1, wherein:
the transformer includes a tertiary winding coupled with the primary winding; and
the detector is configured to detect a voltage of the main switch according to a voltage generated by the tertiary winding.

8. A DC converter having a transformer, a main switch connected in series with a primary winding of the transformer, and a series circuit connected to ends of one of the primary winding and main switch and including a clamp capacitor and an auxiliary switch, the main and auxiliary switches being alternately turned on/off so that a secondary winding of the transformer generates a voltage that is rectified and smoothed with a rectifying/smoothing circuit to provide a DC output, the DC converter comprising:
a first time difference detector configured to detect a time difference between a point around which the main switch provides a minimum level after the auxiliary switch turns off and a point at which the main switch turns on;
a second time difference detector having a lower minimum level of detecting sensitivity than the first time difference detector, configured to detect a time difference between a point around which the main switch provides a minimum level after the auxiliary switch turns off and a point at which the main switch turns on;

an integrator configured to integrate the output of the first time difference detector; and
a delay controller configured to control a turn-on point of the main switch according to the outputs of the integrator and second time difference detector,
the delay controller operating to minimize the output of the first time difference detector according to the output of the integrator and controlling a turn-on point of the main switch in a pulse-by-pulse manner according to a pulse-by-pulse control signal based on the output of the second time difference detector.

9. The DC converter of claim 8, wherein
the first and second time difference detectors share a capacitive element connected to an end of the main switch.

10. The DC converter of claim 8, wherein the first time difference detector comprises:
a second voltage change detector configured to detect a temporal change in the voltage of the main switch; and
an ON detector configured to detect when the main switch turns on.

11. The DC converter of claim 8, wherein the integrator comprises
an integration element configured to add thereto the pulse-by-pulse control signal.

12. The DC converter of claim 8, wherein
the first time difference detector controls a minimum level detecting sensitivity according to the output of the integrator and a voltage resonance frequency of the main switch.

13. The DC converter of claim 8, further comprising:
a first operation unit configured to add or subtract the output of the integrator; and
a second operation unit configured to subtract a predetermined value from an adding output from the first operation unit or adding the predetermined value to a subtracting output from the first operation unit at intervals of an on/off period of the main switch.

14. The DC converter of claim 8, wherein
the delay control unit controls a turn-on point of the auxiliary switch in a pulse-by-pulse manner according to the pulse-by-pulse control signal.

15. The DC converter of claim 8, wherein:
the transformer includes a tertiary winding coupled with the primary winding; and
each of the first time difference detector and the second time difference detector is configured to detect a voltage of the main switch according to a voltage generated by the tertiary winding.

16. A DC converter having a transformer, a main switch connected in series with a primary winding of the transformer, and a series circuit connected to ends of one of the primary winding and main switch and including a clamp capacitor and an auxiliary switch, the main and auxiliary switches being alternately turned on/off so that a secondary winding of the transformer generates a voltage that is rectified and smoothed with a rectifying/smoothing circuit to provide a DC output, the DC converter comprising:
a time difference detector configured to detect a time difference between a point around which the main switch provides a minimum level after the auxiliary switch turns off and a point at which the main switch turns on;
an integrator configured to integrate the output of the time difference detector;
a first voltage change detector configured to detect a temporal change in the voltage of the main switch; and a delay controller configured to control a turn-on point of the main switch according to the outputs of the integrator and first voltage change detector,
the delay controller operating to minimize the output of the time difference detector according to the output of the integrator and controlling a turn-on point of the main switch in a pulse-by-pulse manner according to a pulse-by-pulse control signal based on the output of the first voltage change detector.

17. The DC converter of claim 16, wherein
the time difference detector and first voltage change detector share a capacitive element connected to an end of the main switch.

18. The DC converter of claim 16, wherein the time difference detector comprises:
a second voltage change detector configured to detect a temporal change in the voltage of the main switch; and
an ON detector configured to detect when the main switch turns on.

19. The DC converter of claim 16, wherein the integrator comprises
an integration element configured to add thereto the pulse-by-pulse control signal.

20. The DC converter of claim 16, wherein
the time difference detector controls a minimum level detecting sensitivity according to the output of the integrator and a voltage resonance frequency of the main switch.

21. The DC converter of claim 16, further comprising:
a first operation unit configured to add or subtract the output of the integrator; and
a second operation unit configured to subtract a predetermined value from an adding output from the first operation unit or adding the predetermined value to a subtracting output from the first operation unit at intervals of an on/off period of the main switch.

22. The DC converter of claim 16, wherein
the delay control unit controls a turn-on point of the auxiliary switch in a pulse-by-pulse manner according to the pulse-by-pulse control signal.

23. The DC converter of claim 16, wherein:
the transformer includes a tertiary winding coupled with the primary winding; and
each of the time difference detector and the first voltage change detector is configured to detect a voltage of the main switch according to a voltage generated by the tertiary winding.

24. A DC converter having a transformer, a main switch connected in series with a primary winding of the transformer, and a series circuit connected to ends of one of the primary winding and main switch and including a clamp capacitor and an auxiliary switch, the main and auxiliary switches being alternately turned on/off so that a secondary winding of the transformer generates a voltage that is rectified and smoothed with a rectifying/smoothing circuit to provide a DC output, the DC converter comprising:
a time difference detector configured to detect a time difference between a point around which the main switch provides a minimum level after the auxiliary switch turns off and a point at which the main switch turns on;
an integrator configured to integrate the output of the time difference detector;
a voltage detector configured to detect a voltage of the main switch; and a delay controller configured to control a turn-on point of the main switch according to the outputs of the integrator and voltage detector, the delay controller operating to minimize the output of the time difference detector according to the output of the integrator and controlling a turn-on point of the main switch in a pulse-by-pulse manner according to a pulse-by-pulse control signal based on the output of the voltage detector.

25. The DC converter of claim 24, wherein the time difference detector comprises:

a second voltage change detector configured to detect a temporal change in the voltage of the main switch; and an ON detector configured to detect when the main switch turns on.

26. The DC converter of claim 24, wherein the integrator comprises an integration element configured to add thereto the pulse-by-pulse control signal.

27. The DC converter of claim 24, wherein the time difference detector controls a minimum level detecting sensitivity according to the output of the integrator and a voltage resonance frequency of the main switch.

28. The DC converter of claim 24, further comprising:

a first operation unit configured to add or subtract the output of the integrator; and a second operation unit configured to subtract a predetermined value from an adding output from the first operation unit or adding the predetermined value to a subtracting output from the first operation unit at intervals of an on/off period of the main switch.

29. The DC converter of claim 24, wherein the delay control unit controls a turn-on point of the auxiliary switch in a pulse-by-pulse manner according to the pulse-by-pulse control signal.

30. The DC converter of claim 24, wherein:

the transformer includes a tertiary winding coupled with the primary winding; and each of the time difference detector and the voltage detector is configured to detect a voltage of the main switch according to a voltage generated by the tertiary winding.

* * * * *